(12) United States Patent
Oberman et al.

(10) Patent No.: US 8,190,669 B1
(45) Date of Patent: *May 29, 2012

(54) MULTIPURPOSE ARITHMETIC FUNCTIONAL UNIT

(75) Inventors: Stuart F. Oberman, Sunnyvale, CA (US); Ming Y. Siu, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1108 days.

This patent is subject to a terminal disclaimer.

(21) Appl. No.: 10/970,253

(22) Filed: Oct. 20, 2004

(51) Int. Cl.
*G06F 7/44* (2006.01)

(52) U.S. Cl. ........ 708/523; 708/230; 708/235; 708/236; 708/277; 708/276; 708/290; 708/500; 708/605; 712/221

(58) Field of Classification Search .......... 708/276, 708/277, 290, 500, 230, 235, 236, 523, 605; 712/221
See application file for complete search history.

(56) References Cited

U.S. PATENT DOCUMENTS

| | | | |
|---|---|---|---|
| 4,771,379 A | 9/1988 | Ando et al. | |
| 4,893,268 A | 1/1990 | Denman et al. | |
| 4,969,118 A | 11/1990 | Montoye et al. | |
| 4,972,362 A | 11/1990 | Elkind et al. | |
| 5,068,816 A | 11/1991 | Noetzel | |
| 5,241,636 A | 8/1993 | Kohn | |
| 5,450,556 A | 9/1995 | Slavenburg et al. | |
| 5,452,241 A | 9/1995 | Desrosiers et al. | |
| 5,487,022 A | 1/1996 | Simpson et al. | |
| 5,517,438 A | 5/1996 | Dao-Trong et al. | |
| 5,524,090 A | 6/1996 | Iwamura | |
| 5,524,244 A | 6/1996 | Robinson et al. | |
| 5,548,545 A | 8/1996 | Brashears et al. | |
| 5,561,810 A | 10/1996 | Ohtomo | |
| 5,581,778 A | 12/1996 | Chin et al. | |
| 5,673,407 A | 9/1997 | Poland et al. | |
| 5,701,405 A | 12/1997 | Kelley et al. | |
| 5,734,874 A | 3/1998 | Van Hook et al. | |
| 6,061,781 A | 5/2000 | Jain et al. | |
| 6,198,488 B1 | 3/2001 | Lindholm et al. | |
| 6,243,732 B1 | 6/2001 | Arakawa et al. | |
| 6,317,133 B1 | 11/2001 | Root et al. | |
| 6,363,476 B1 | 3/2002 | Ide | |
| 6,480,872 B1 | 11/2002 | Choquette | |
| 6,490,607 B1 | 12/2002 | Oberman | |
| 6,557,022 B1 | 4/2003 | Sih et al. | |
| 6,873,324 B2 | 3/2005 | Saito et al. | |

(Continued)

FOREIGN PATENT DOCUMENTS

DE 11 2006 003 473 T5 10/2008

(Continued)

OTHER PUBLICATIONS

Andrew Tannenbaum, Structured Computer Organization, Prentice-Hall, 1984, p. 11.*

(Continued)

*Primary Examiner* — William M Treat
(74) *Attorney, Agent, or Firm* — Kilpatrick Townsend & Stockton LLP

(57) ABSTRACT

Multipurpose arithmetic functional units can perform planar attribute interpolation and unary function approximation operations. In one embodiment, planar interpolation operations for coordinates (x, y) are executed by computing A*x+B*y+C, and unary function approximation operations for operand x are executed by computing $F_2(x_b)*x_h^2 + F_1(x_b)*x_h + F_0(x_b)$, where $x_h = x - x_b$. Shared multiplier and adder circuits are advantageously used to implement the product and sum operations for both classes of operations.

18 Claims, 11 Drawing Sheets

| UNARY FUNCTION APPROXIMATION (UFA) | | | | |
|---|---|---|---|---|
| NAME | REDUCED RANGE (x) | OPERAND FORMAT | RESULT | POST-PROCESSING |
| SIN, COS | [0, 1) | 25 fraction bits (x) | sin x, cos x | (none) |
| EXP | ?? | 7 integer bits (I), 23 fraction bits (x) | $2^x$ | $*2^I$ |
| LOG | ?? | fp32 (s.E.M); x=1.M | $\log_2 x + E$ | (none) |
| RCP | [1, 2) | fp32 (s.E.M); x=1.M | 1/x | $*2^{-E}$ |
| RSQ | [1, 4) | fp32 (s.E.M); x=1.M | $x^{-1/2}$ | $*2^{-E/2}$ |

| PLANAR INTERPOLATION (PI) | | |
|---|---|---|
| NAME | INPUTS | RESULT |
| IPA | A, B, C: fp32<br>x, y: s13<br>$dx_i$, $dy_i$: u4 (4 sets) | $U = A*x + B*y + C$<br>(for 4 fragments) |
| IPAW | A, B, C: fp32<br>x, y: s13<br>$dx_i$, $dy_i$: u4 (4 sets) | $U*w$ (for 4 fragments), where $U = A*x + B*y + C$ |

U.S. PATENT DOCUMENTS

| | | | |
|---|---|---|---|
| 6,895,423 | B2 | 5/2005 | Kawata |
| 6,912,557 | B1 | 6/2005 | North et al. |
| 6,976,043 | B2 | 12/2005 | Clifton |
| 7,437,538 | B1 | 10/2008 | Brooks et al. |
| 7,484,076 | B1 | 1/2009 | Oberman et al. |
| 7,617,384 | B1 | 11/2009 | Coon et al. |
| 7,640,285 | B1 * | 12/2009 | Oberman et al. ............. 708/523 |
| 7,747,842 | B1 | 6/2010 | Goudy et al. |
| 2004/0085321 | A1 | 5/2004 | Oka et al. |
| 2005/0235134 | A1 | 10/2005 | O'Sullivan |
| 2005/0273769 | A1 | 12/2005 | Eichenberger et al. |
| 2006/0098021 | A1 | 5/2006 | Rim et al. |
| 2009/0049276 | A1 | 2/2009 | Bergland et al. |

FOREIGN PATENT DOCUMENTS

| | | |
|---|---|---|
| GB | 2455401 B | 5/2010 |
| JP | 7-281872 A2 | 10/1995 |
| JP | 8-87400 A | 4/1996 |
| JP | 2008-302713 A | 12/2008 |
| KR | 10-1009095 | 12/2008 |

OTHER PUBLICATIONS

Jain et al., "Rapid System Prototyping for High Performance Reconfigurable Computing", Design Automation for Embedded Systems, Kluwer Academic Publishers, Boston, vol. 5, pp. 339-350.*

Jain et al., "Hardware Implementaion, of a Nonlinear Processor", Proceedings of the 1999 IEEE International Symposium on Circuits and Systems, May 30-Jun. 2, 1999, vol. 6, pp. 509-514.*

Ligon et al., "Implementation and Analysis of Numerical Components for Reconfigurable Computing", Proceedings of the 1999 IEEE Aerospace Conference, Mar. 6-13, 1999, vol. 2, pp. 325-335.*

Office Action of Dec. 7, 2010 in related U.S. Appl. No. 11/359,353.

Office Action of Jul. 20, 2010 in related U.S. Appl. No. 11/359,353.

Office Action of Jan. 7, 2010 in related U.S. Appl. No. 11/359,353.

Piñeiro et al., "Faithful Powering Computation Using Table Look-up and a Fused Accumulation Tree" Proceedings of the 15th IEEE Symposium on Computer Arithmetic (Arith'01), (2001).

Muller, "Partially rounded" Small-Order Approximations for Accurate, Hardware-Oriented, Table Based Methods Proceedings of the 16th IEEE Symposium on Computer Arithmetic (Arith'03), (2003).

"High-Speed Double-Precision Computation of Reciprocal, Division, Square Root, and Inverse Square Root," Bruguera et al, IEEE Transactions on Computers, vol. 51, No. 12, Dec. 2002.

Kurzak, Jakub et al.; "Implementation of the Mixed-Precision High Performance LINPACK Benchmark on the CELL Processor"; 2006, Technical Report No. UT-CS-06-580, Department of Computer Science, University of Tennessee, 12 pages.

Owens, John D., et al., "A Survey of General-Purpose Computation on Graphics Hardware," Eurographics 2005, State of Art Reports, pp. 21-51, (Aug. 2005).

Schwarz, Eric M., "FPU Implementations with Denormalized Numbers," IEEE Trans. on Computers, vol. 55. No. 7. pp. 825-835, (Jul. 2005).

He, Hu, et al., "Multiply-Add Fused Float Point Unit with On-fly Denormalized Number Processing," IEEE, pp. 1466-1468, (2005).

Bedard, N., et al., "The Weitek 64-bit Floating-Point Datapath Unit," Weitek Corporation, Maple Press, pp. 898-902, (1988).

Office Action dated May 25, 2011, Japanese Patent Application No. 2007-541334, in related case 019680-012000JP, 3 pages (in Japanese).

Great Britain Examination Report of Mar. 25, 2009 in Application No. GB0821495.9.

Office Action of Feb. 15, 2011 in related U.S. Appl. No. 11/611,800.

Office Action of Oct. 6, 2010 in related U.S. Appl. No. 11/611,800.

Office Action of Jun. 7, 2011 in related U.S. Appl. No. 11/952,858.

Office Action of Feb. 17, 2011 in related U.S. Appl. No. 11/952,858.

* cited by examiner

| UNARY FUNCTION APPROXIMATION (UFA) | | | | |
|---|---|---|---|---|
| NAME | REDUCED RANGE (x) | OPERAND FORMAT | RESULT | POST-PROCESSING |
| SIN, COS | [0, 1) | 25 fraction bits (x) | sin x, cos x | (none) |
| EXP | ?? | 7 integer bits (I), 23 fraction bits (x) | $2^x$ | $*2^I$ |
| LOG | ?? | fp32 (s.E.M); x=1.M | $\log_2 x + E$ | (none) |
| RCP | [1, 2) | fp32 (s.E.M); x=1.M | $1/x$ | $*2^{-E}$ |
| RSQ | [1, 4) | fp32 (s.E.M); x=1.M | $x^{-1/2}$ | $*2^{-E/2}$ |

302

| PLANAR INTERPOLATION (PI) | | |
|---|---|---|
| NAME | INPUTS | RESULT |
| IPA | A, B, C: fp32<br>x, y: s13<br>$dx_i$, $dy_i$: u4 (4 sets) | $U = A*x + B*y + C$<br>(for 4 fragments) |
| IPAW | A, B, C: fp32<br>x, y: s13<br>$dx_i$, $dy_i$: u4 (4 sets) | $U*w'$ (for 4 fragments), where $U = A*x + B*y + C$ |

MULTIPURPOSE ARITHMETIC FUNCTIONAL UNIT

CROSS REFERENCES TO RELATED APPLICATIONS

The present disclosure is related to the following commonly-assigned co-pending U.S. patent applications: application Ser. No. 10/861,184, filed Jun. 3, 2004, entitled "High-Speed Function Approximation"; and application Ser. No. 10/970,101, filed of even date herewith, entitled "Multipurpose Arithmetic Functional Unit." The respective disclosures of each of these applications are incorporated herein by reference for all purposes.

BACKGROUND OF THE INVENTION

The present invention relates in general to microprocessors, and in particular to a multipurpose arithmetic functional unit for a processor core.

Real-time computer animation places extreme demands on processors. To meet these demands, dedicated graphics processing units typically implement a highly parallel architecture in which a number (e.g., 16) of cores operate in parallel, with each core including multiple (e.g., 8) parallel pipelines containing functional units for performing the operations supported by the processing unit. These operations generally include various integer and floating point arithmetic operations such as addition; multiplication; various algebraic, transcendental, and trigonometric functions; and planar attribute interpolation. The pipelines are generally of identical design so that any supported instruction can be processed by any pipeline; accordingly, each pipeline requires a complete set of functional units.

Conventionally, each functional unit is specialized to handle only one or two operations, and the pipelines usually provide sequential arrangements of functional units designed to optimize execution time for an expected sequence of operations (e.g., for vertex or fragment shading operations). For example, the functional units in a pipeline might include an attribute interpolation unit, followed by a texture computation unit, followed by various arithmetic units for computing sums, products, logarithms, exponents, trigonometric functions, and the like. Each of these functional units consumes chip area and power, adding to the design complexity and cost. Further, because it is specialized, a given functional unit is useful only a fraction of the time.

It would, therefore, be desirable to provide functional units that require reduced chip area and that can be used more efficiently.

BRIEF SUMMARY OF THE INVENTION

Embodiments of the present invention provide multipurpose arithmetic functional units that can perform planar attribute interpolation as well as a variety of transcendental functions. In one embodiment, the functional unit can execute planar interpolation operations by computing $U(x, y) = A^*x + B^*y + C$ and can also execute unary function operations by computing an approximation of the form $f(x) \approx F_2(x_b)^*x_h^2 + F_1(x_b)^*x_h + F_0(x_b)$ (where $x_h = x - x_b$). This form can be used to approximate various algebraic and transcendental functions including reciprocals, square roots, logarithms, exponents, and trigonometric functions. Shared multiplier and adder circuits are advantageously used to implement the product and sum operations for both classes of operations.

According to one aspect of the present invention, a method for operating a functional unit of a microprocessor is provided. An opcode is received, the opcode designating one of a plurality of supported operations to be performed, and one or more operands on which the designated operation is to be performed are also received. In response to the opcode and the one or more operands, inputs M2, µ2, M1, µ1 and M0 are selected. Configurable arithmetic circuits in the functional unit are operated to compute an operation result of the form $M2^*\mu2 + M1^*\mu1 + M0$ from the selected inputs M2, µ2, M1, µ1 and M0. The supported operations includes a unary function approximation (UFA) operation for approximating a unary function $f(x)$ of an argument operand x and a planar interpolation (PI) operation for performing planar interpolation on coordinate operands x and y.

In some embodiments, in the event that the UFA operation is designated, the inputs M2, µ2, M1, µ1 and M0 are advantageously selected such that the configurable arithmetic circuits compute an operation result corresponding to $F_2(x_b)^*x_h^2 + F_1(x_b)^*x_h + F_0(x_b)$, where $x_b$ is a baseline value, $x_h$ is the difference between the argument operand x and the baseline value $x_b$, and $F_2$, $F_1$, and $F_0$ are coefficients determined based on the baseline value xb and the unary function $f(x)$. A number of different UFA operations may be supported, including, e.g., a trigonometric operation, an exponential operation, a logarithm operation, a reciprocal operation, and a reciprocal square root operation.

In some embodiments, in the event that the PI operation is designated, the inputs M2, µ2, M1, µ1 and M0 are advantageously selected such that the configurable arithmetic circuits compute an operation result corresponding to $A^*x + B^*y + \Delta$, wherein A, B, and C are interpolation parameters and $\Delta$ is an offset term that depends at least in part on the interpolation parameter C. For example, the interpolation coefficients A and B may be selected as inputs M2 and M1, respectively while the coordinate operands x and y are selected as inputs µ2 and µ1, respectively. In one embodiment, the interpolation coefficient C is selected as the input M0. In another embodiment, the offset term $\Delta$ is computed as $\Delta = A^*dx + B^*dy + C$ for coordinate offsets dx and dy, and the offset term $\Delta$ is selected as the input M0. In still another embodiment, a number of different coordinate offsets $dx_i$ and $dy_i$ are obtained, and offset terms A, are computed as $\Delta i = A^*dx_i + B^*dy_i + C$. The offset terms $\Delta_i$ can be selected as a group of inputs $M0_i$ and the configurable arithmetic circuits can be operated to compute a plurality of operation results of the form $M2^*\mu2 + M1^*\mu1 + M0_i$.

The following detailed description together with the accompanying drawings will provide a better understanding of the nature and advantages of the present invention.

BRIEF DESCRIPTION OF THE DRAWINGS

FIG. 3 is a listing of operations performed by a multipurpose arithmetic functional unit according to an embodiment of the present invention;

DETAILED DESCRIPTION OF THE INVENTION

Embodiments of the present invention provide high-speed multipurpose arithmetic functional units for any processing system capable of performing large numbers of high-speed computations, such as a graphics processor. In one embodiment, the functional unit can execute planar interpolation operations by computing $U(x, y)=A*x+B*y+C$ and can also execute unary function operations by computing an approximation of the form $f(x) \approx F_2(x_b)*x_h^2+F_1(x_b)*x_h+F_0(x_b)$ (where $x_h=x-x_b$). This form can be used to approximate various algebraic and transcendental functions including reciprocals, square roots, logarithms, exponents, and trigonometric functions. Shared multiplier and adder circuits are advantageously used to implement the product and sum operations for both classes of operations.

I. System Overview

A. Graphics Processor

Figure 1:
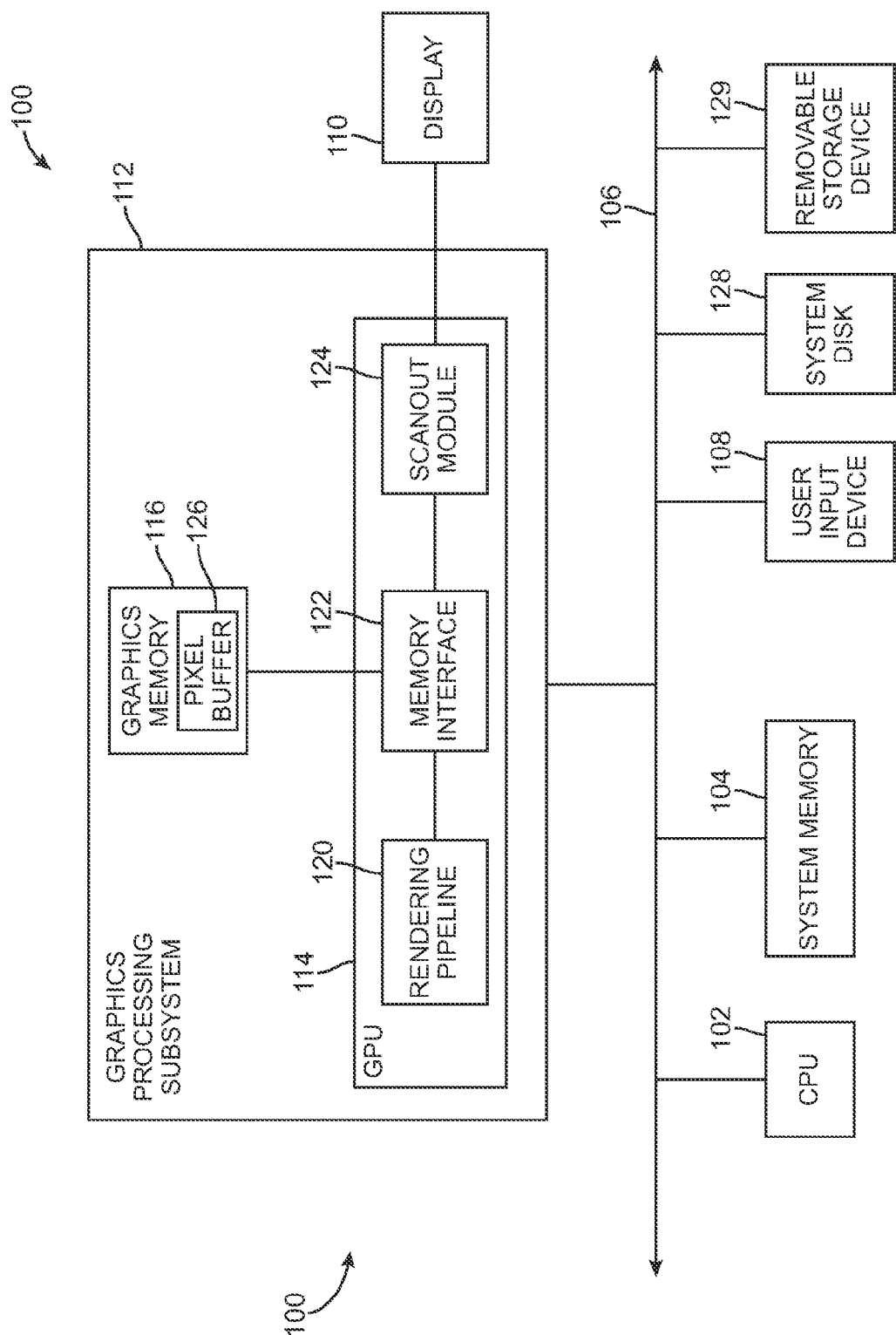
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus 106. User input is received from one or more user input devices 108 (e.g., keyboard, mouse) coupled to bus 106. Visual output is provided on a pixel based display device 110 (e.g., a conventional CRT or LCD based monitor) operating under control of a graphics processing subsystem 112 coupled to system bus 106. A system disk 128 and other components, such as one or more removable storage devices 129 (e.g., floppy disk drive, compact disk (CD) drive, and/or DVD drive), may also be coupled to system bus 106. System bus 106 may be implemented using one or more of various bus protocols including PCI (Peripheral Component Interconnect), AGP (Advanced Graphics Processing) and/or PCI-Express (PCI-E); appropriate "bridge" chips such as a north bridge and south bridge (not shown) may be provided to interconnect various components and/or buses.

Graphics processing subsystem 112 includes a graphics processing unit (GPU) 114 and a graphics memory 116, which may be implemented, e.g., using one or more integrated circuit devices such as programmable processors, application specific integrated circuits (ASICs), and memory devices. GPU 114 includes a rendering module 120, a memory interface module 122, and a scanout module 124. Rendering module 120 may be configured to perform various tasks related to generating pixel data from graphics data supplied via system bus 106 (e.g., implementing various 2D and or 3D rendering algorithms), interacting with graphics memory 116 to store and update pixel data, and the like. Rendering module 120 is advantageously configured to generate pixel data from 2-D or 3-D scene data provided by various programs executing on CPU 102. The particular configuration of rendering module 120 may be varied as desired, and a detailed description is omitted as not being critical to understanding the present invention.

Memory interface module 122, which communicates with rendering module 120 and scanout control logic 124, manages all interactions with graphics memory 116. Memory interface module 122 may also include pathways for writing pixel data received from system bus 106 to graphics memory 116 without processing by rendering module 120. The particular configuration of memory interface module 122 may be varied as desired, and a detailed description is omitted as not being critical to understanding the present invention.

Graphics memory 116, which may be implemented using one or more integrated circuit memory devices of generally conventional design, may contain various physical or logical subdivisions, such as a pixel buffer 126. Pixel buffer 126 stores pixel data for an image (or for a part of an image) that is read and processed by scanout control logic 124 and transmitted to display device 110 for display. This pixel data may be generated, e.g., from 2D or 3D scene data provided to rendering module 120 of GPU 114 via system bus 106 or generated by various processes executing on CPU 102 and provided to pixel buffer 126 via system bus 106.

Scanout module 124, which may be integrated in a single chip with GPU 114 or implemented in a separate chip, reads pixel color data from pixel buffer 118 and transfers the data to display device 110 to be displayed. In one embodiment, scanout module 124 operates isochronously, scanning out frames of pixel data at a prescribed refresh rate (e.g., 80 Hz) regardless of any other activity that may be occurring in GPU 114 or elsewhere in system 100. In some embodiments, the prescribed refresh rate can be a user selectable parameter, and the scanout order may be varied as appropriate to the display format (e.g., interlaced or progressive scan). Scanout module 124 may also perform other operations, such as adjusting color values for particular display hardware and/or generating composite screen images by combining the pixel data from pixel buffer 126 with data for a video or cursor overlay image or the like, which may be obtained, e.g., from graphics memory 116, system memory 104, or another data source (not shown). The particular configuration of scanout module 124 may be varied as desired, and a detailed description is omitted as not being critical to understanding the present invention.

During operation of system 100, CPU 102 executes various programs such as operating system programs, application programs, and driver programs for graphics processing subsystem 112. The driver programs may implement conventional application program interfaces (APIs) such as OpenGL, Microsoft DirectX or D3D that enable application and operating system programs to invoke various functions of graphics processing subsystem 112 as is known in the art. Operation of graphics processing subsystem 112 may be made asynchronous with other system operations through the use of appropriate command buffers.

It will be appreciated that the system described herein is illustrative and that variations and modifications are possible. A GPU may be implemented using any suitable technologies, e.g., as one or more integrated circuit devices. The GPU may be mounted on an expansion card that may include one or more such processors, mounted directly on a system motherboard, or integrated into a system chipset component (e.g., into the north bridge chip of one commonly used PC system architecture). The graphics processing subsystem may include any amount of dedicated graphics memory (some implementations may have no dedicated graphics memory) and may use system memory and dedicated graphics memory in any combination. In particular, the pixel buffer may be implemented in dedicated graphics memory or system memory as desired. The scanout circuitry may be integrated with a GPU or provided on a separate chip and may be implemented, e.g., using one or more ASICs, programmable processor elements, other integrated circuit technologies, or any combination thereof. In addition, GPUs embodying the present invention may be incorporated into a variety of devices, including general purpose computer systems, video game consoles and other special purpose computer systems, DVD players, handheld devices such as mobile phones or personal digital assistants, and so on.

B. Execution Core

Figure 2:
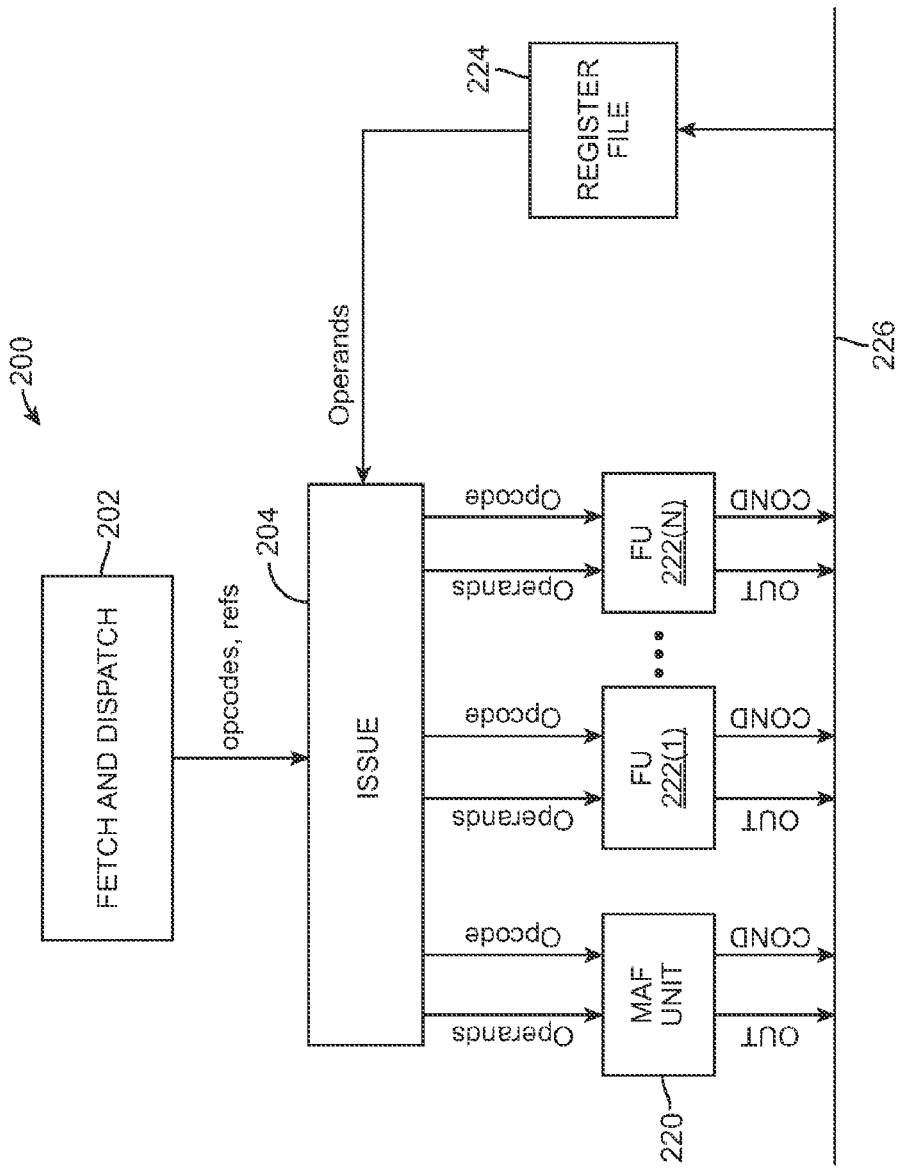
FIG. 2 is a block diagram of a portion of an execution core according to an embodiment of the present invention.

FIG. 2 is a block diagram of an execution core 200 according to an embodiment of the present invention. Execution core 200, which may be implemented, e.g., in a programmable shader for rendering module 120 of GPU 114 described above, is configured to execute arbitrary sequences of instructions for performing various computations. Execution core 200 includes a fetch and dispatch unit 202, an issue unit 204, a multipurpose arithmetic functional (MAF) unit 220, a number (M) of other functional units (FU) 222, and a register file 224. Each functional unit 220, 222 is configured to perform specified operations. The operations performed by MAF unit 220 are described below. The other functional units 222 may be of generally conventional design and may support a variety of operations such as addition, multiplication, bitwise logic operations, comparison operations, format conversion operations, texture filtering, memory access (e.g., load and store operations), and so on.

During operation of execution core 200, fetch and dispatch unit 202 obtains instructions from an instruction store (not shown), decodes them, and dispatches them as opcodes with associated operand references or operand data to issue unit 204. For each instruction, issue unit 204 obtains any referenced operands, e.g., from register file 224. When all operands for an instruction are ready, issue unit 204 issues the instruction by sending the opcode and operands to MAF unit 220 or another functional unit 222. Issue unit 204 advantageously uses the opcode to select the appropriate functional unit to execute a given instruction. Fetch and dispatch unit 202 and issue unit 204 may be implemented using conventional microprocessor architectures and techniques, and a detailed description is omitted as not being critical to understanding the present invention.

MAF unit 220 and other functional units 222 receive the opcodes and associated operands and perform the specified operation on the operands. Result data is provided in the form of result values that can be forwarded to register file 224 (or another destination) via a data transfer path 226.

It will be appreciated that the execution core of FIG. 2 is illustrative and that variations and modifications are possible. Fetch and dispatch unit 202 and issue unit 204 may implement any desired microarchitecture, including scalar or superscalar architectures with in-order or out-of-order instruction issue, speculative execution modes, and so on as desired. In some architectures, the issue unit may receive and/or issue a long instruction word that includes opcodes and operands for multiple functional units or multiple opcodes and/or operands for one functional unit. The execution core may also include a sequence of pipelined functional units in which results from functional units in one stage are forwarded to functional units in later stages rather than directly to a register file; the functional units in such a configuration can be controlled by a single long instruction word or separate instructions. Persons of ordinary skill in the art with access to the present teachings will recognize that MAF unit 220 can be implemented as a functional unit in any microprocessor, not limited to graphics processors or to any particular processor or execution core architecture.

C. MAF Unit

In accordance with one embodiment of the present invention, execution core 200 includes a MAF unit 220 that executes two classes of operations: planar interpolation (PI) and unary function approximation (UFA). MAF unit 220 advantageously handles inputs and outputs in various floating-point and fixed-point formats, and operands for different operations can be in different formats. Before describing an embodiment of MAF unit 220, representative formats will be defined.

"Fp32", as used herein, refers to the standard IEEE 754 single precision floating-point format in which a normal floating point number is represented by a sign bit, eight exponent bits, and 23 significand bits. The exponent is biased upward by 127 so that exponents in the range $2^{-126}$ to $2^{127}$ are represented using integers from 1 to 254. For "normal" numbers, the 23 significand bits are interpreted as the fractional portion of a 24-bit mantissa with an implied 1 as the integer portion. Numbers with all zeroes in the exponent bits are referred to as denorms and are interpreted as not having an implied leading 1 in the mantissa; such numbers may represent, e.g., an underflow in a computation. The (positive or negative) number with all ones in the exponent bits and zeroes in the significand bits are referred to as (positive or negative) INF; this number may represent, e.g., an overflow in a computation. Numbers with all ones in the exponent bits and a non-zero number in the significand bits are referred to as Not a Number (NaN) and may be used, e.g., to represent a value that is undefined. Zero is also considered a special number and is represented by all of the exponent and significand bits being set to zero.

Fixed-point formats are specified herein by an initial "s" or "u" indicating whether the format is signed or unsigned and a number denoting the total number of bits (e.g., 4, 13); thus, s13 refers to signed 13-bit format, u4 to an unsigned four-bit format and so on. For the signed formats, two's complement negation is advantageously used. In all formats used herein, the most significant bit (MSB) is at the left of the bit field and the least significant bit (LSB) is at the right.

It is to be understood that these formats are defined and referred to herein for purposes of illustration and that a MAF unit might support any combination of these formats or different formats without departing from the scope of the present invention.

An embodiment of MAF unit 220 according to the present invention will now be described. FIG. 3 lists unary function approximation (UFA) operations and planar interpolation (PI) operations that can be performed by this embodiment of MAF unit 220.

UFA operations (listed at 302) include a variety of algebraic and transcendental functions $f(x)$ that can be computed using a polynomial approximation, such as trigonometric functions (SIN, COS), exponential (EXP), logarithm (LOG), reciprocal (RCP), and reciprocal square root (RSQ). It is to be understood that MAF unit 220 may support any combination of unary functions, not limited to those listed in FIG. 3.

In one embodiment, MAF unit 220 executes each UFA operation by computing a polynomial approximation of the form:

$$f(x) \approx F_2(x_b)*x_h^2 + F_1(x_b)*x_h + F_0(x_b), \quad \text{(Eq. 1)}$$

where $x_b$ is a "baseline" value that is close to x and $x_h$ is the difference between $x_b$ and x. A finite number of base values $x_b$ is selected, and for each $x_b$, a set of coefficients $F_2$, $F_1$, $F_0$ is determined. Different unary functions $f(x)$ will generally have different coefficients $F_2$, $F_1$, $F_0$ for a given $x_b$, and may also use different values of $x_b$. Numerous techniques for determining coefficients for polynomial approximations to functions are known in the art; examples are described in above-referenced application Ser. No. 10/861,184.

MAF unit 220 advantageously includes lookup tables (LUTs) or other data storage circuits that are pre-loaded with sets of values of $F_2(x_b)$, $F_1(x_b)$ and $F_0(x_b)$ for each supported UFA operation. MAF unit 220 also includes multiplier and adder circuits arranged to compute Eq. 1. When a UFA operation is executed, the coefficients are retrieved from the lookup tables based on the operand x, and the computation is performed.

To reduce the size of the lookup tables for a given UFA operation, argument reduction is advantageously applied to operand x before operand x is supplied to MAF unit 220. Argument reduction (also referred to as range reduction) is well known in the art and refers generally to limiting the argument x of a function to some bounded interval. For example, the functions sin x and cos x are both periodic with period $2\pi$. Thus, sin x for arbitrary x can be computed by reducing the argument x according to $x=x_0+2\pi K$, where K is an integer and $0 \leq x_0 < 2\pi$, then computing sin $x_0$=sin x. In some implementations, the reduced argument $x_0$ is specified as a fraction $x_R=x_0/2\pi$, where $0 \leq x_R < 1$. Similarly, the reciprocal of an operand x can be computed by expressing x as $x_R*2^E$, where $1 \leq x_R < 2$. The reciprocal of $2^E$ is just $2^{-E}$, and the reciprocal of a reduced operand $x_R$ can be computed using lookup tables that cover just the interval [1, 2). (The reciprocal of x will always have the same sign as x, so it is not necessarily to consider negative x values separately.)

Section 302 of FIG. 3 summarizes the ranges and input formats for the UFA operations supported by MAF unit 220 in this embodiment. Argument reduction can be implemented in a separate functional unit from MAF unit 220, with the result of the argument reduction operation being provided to MAF unit 220. Argument reduction techniques for each operation listed in section 302 are known in the art; for purposes of the present description, it is assumed that MAF unit 220 receives arguments (operand x) in reduced form. For some operations, post-processing (in the form of scaling by a power of 2) is applied as shown in FIG. 3. Such post-processing may be implemented in circuits other than MAF unit 220; such circuits can be of conventional design, and a detailed description of this post-processing is omitted.

In addition to UFA operations, MAF unit 220 also supports two planar interpolation (PI) operations, listed at section 304 in FIG. 3. "IPA" denotes planar attribute interpolation without perspective correction, and "IPAW" denotes planar attribute interpolation with perspective correction.

In general, planar interpolation for an attribute U in an (x, y) plane involves computing a function of the form:

$$U(x,y)=A*x+B*y+C,\quad\text{(Eq. 2)}$$

where A, B and C are interpolation parameters associated with attribute U. As is known in the art, in graphics applications, attributes such as color, texture and so on are usually specified for vertices of primitives that make up a scene to be rendered. These attributes are interpolated in the (x, y) screen plane as needed to determine the color of pixels covered by the primitive. The graphics processor typically includes a circuit configured to compute interpolation parameters A, B, and C; the details of such computations are not relevant to the present invention. In the embodiments described herein, MAF unit 220 receives as operands a set of previously computed interpolation parameters A, B, and C and the coordinates (x, y) for a fragment and computes Eq. 2.

Figure 4:
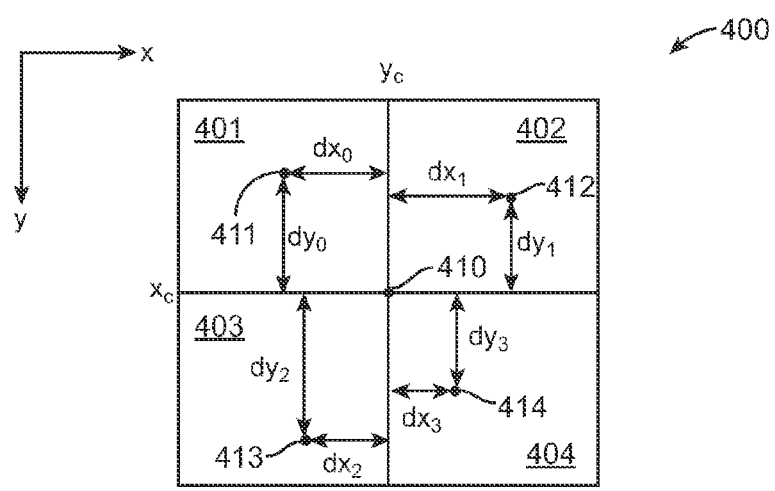
FIG. 4 illustrates a quad of fragments.

In some embodiments, MAF unit 220 is capable of performing attribute interpolation for multiple sample locations (x, y) in parallel. For example, FIG. 4 illustrates a quad 400 consisting of four fragments 401-404 that meet at a quad center 410, which has coordinates ($x_c$, $y_c$). Sample points 411-414 in fragments 401-404 are defined by coordinate offsets relative to ($x_c$, $y_c$); thus, sample point 411 is offset by ($dx_0$, $dy_0$), sample point 412 by ($dx_1$, $dy_1$) and so on. For a sample point with index i (i=0, 1, 2, 3), Eq. 2 above yields:

$$U(x_i,y_i)=A*(x_c+dx_i)+B*(y_c+dy_i)+C=A*x_c+B*y_c+\Delta_i,\quad\text{(Eq. 3)}$$

where:

$$\Delta_i=A*dx_i+B*dy_i+C.\quad\text{(Eq. 4).}$$

In embodiments described herein, quad center coordinates ($x_c$, $y_c$) are integers in s13 format, and the coordinate offsets ($dx_i$, $dy_i$) are fractions restricted to the interval (−1, 1). Using Eqs. 3 and 4, MAF unit 220 can be configured to compute interpolated attributes U($x_i$, $y_i$) in parallel for a number of sample locations i; one such embodiment that supports up to four sample locations is described below. In some embodiments, coordinate offsets ($dx_i$, $dy_i$) are specified as unsigned values in u4 format with index i determining the signs: e.g., for i=0, the signs are (−, −); for i=1, (−, +) and so on. In other embodiments, coordinate offsets ($dx_i$, $dy_i$) may include sign bits and may be in s5 format or another signed integer format.

The IPA and IPAW operations in FIG. 3 differ from each other in that, for IPAW, perspective correction is applied to the interpolated attribute U. As is known in the art, perspective can be modeled using homogeneous coordinates (x, y, w) defined such that coordinates ($\lambda$x, $\lambda$y, $\lambda$w) for all $\lambda \neq 0$ map to the same 2-D coordinates. An attribute value u=U/w is provided for each vertex of the primitive. For perspective correct interpolation, the IPA operation can be used to interpolate (1/w) as an attribute (using Eq. 2 or Eq. 3). An interpolated perspective parameter w' is determined by computing the reciprocal of interpolated (1/w). The attribute u is interpolated (again using Eq. 2 or Eq. 3) to obtain $u_0$, and the perspective-correct attribute U is determined by multiplying $u_0*w'$. Thus, IPA and IPAW operations differ in that IPAW includes an extra multiplication.

MAF unit 220 is advantageously configured to compute Eq. 1 (for unary functions) and Eq. 3 (for planar interpolation) using the same multiplier and adder circuits. Specifically, Eqs. 1, 2 and 3 all have the same general form:

$$\text{Result}=M2*\mu2+M1*\mu1+M0.\quad\text{(Eq. 5)}$$

In MAF unit 220, this similarity is exploited by configuring the same multipliers and adders to compute Eq. 1 or Eq. 3, depending on whether the opcode received from issue circuit 204 designates a UFA or PI operation.

Sections II and III describe a MAF unit 220, with Section II describing a circuit structure for MAF unit 220, and Section III describing how that circuit structure can be used to execute the operations listed in FIG. 3. It is to be understood that the MAF unit 220 described herein is illustrative and that other or different combinations of functions might be supported using appropriate combinations of circuit blocks.

II. Example MAF Unit Structure

Figure 5A:
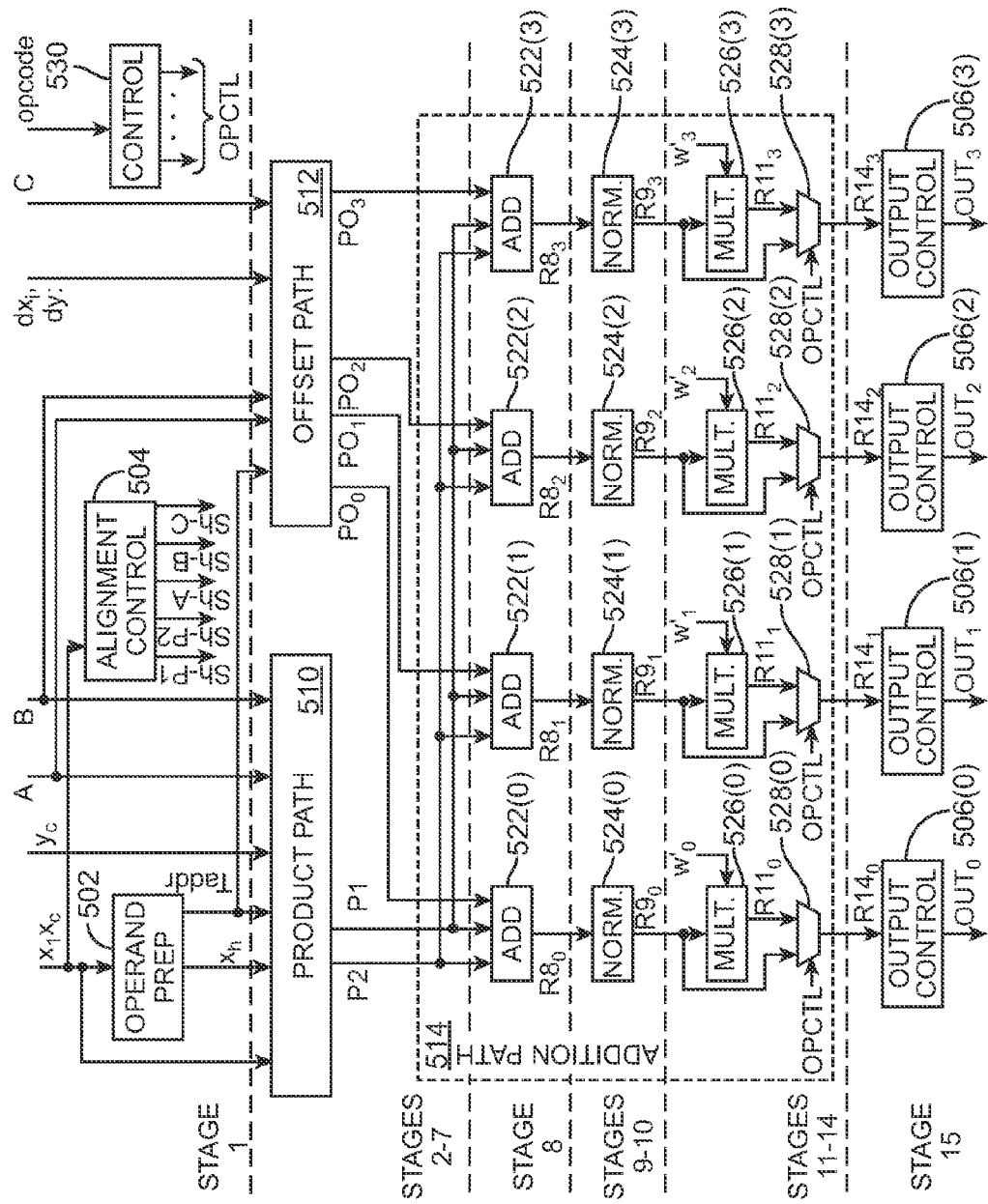
FIG. 5A is a high-level block diagram of a multipurpose arithmetic functional unit according to an embodiment of the present invention.

FIG. 5A is a high-level block diagram of a MAF unit 220 according to an embodiment of the present invention. In this embodiment, MAF unit 220 implements a fifteen-stage pipeline that is used for all operations. On each processor cycle, MAF unit 220 can receive (e.g., from issue circuit 204 of FIG. 2) an opcode and appropriate operands. For a unary function, operand x is provided in a reduced format (see FIG. 3) that includes 24 bits. For planar interpolation function, operands $(x_c, y_c)$, are provided in s13 format, operands A, B, C are provided in fp32 format, and four pixel offsets $(dx_0, dy_0)$; $(dx_1, dy_1)$; $(dx_2, dy_2)$; $(dx_3, dy_3)$ are provided in u4 or s5 format.

MAF unit 220 processes each operation through all of the pipeline stages 1-15 and produces four result values ($OUT_0$-$OUT_3$) that are propagated to data transfer path 226 (FIG. 2). In one embodiment, each stage corresponds to a processor cycle; in other embodiments, elements shown in one stage may be split across multiple processor cycles or elements from two (or more) stages may be combined into one processor cycle.

In the case of PI operations, the four result values $OUT_0$-$OUT_3$ are attribute values at each of four pixels in a quad. In the case of UFA operations, the four result values may be results of four different operations, or all four results may be the same, or only one result path might be active. In one embodiment, issue circuit 204 can simultaneously issue multiple UFA instructions, each with its own operand. As described below, sequencing logic can be used to deliver these instructions sequentially to MAF unit 220, collect the results, and deliver a complete set of collected results onto data transfer path 226. Results on data transfer path 226 may be propagated, e.g., to register file 224 as shown in FIG. 2 and/or to other elements of a processor core, depending on the architecture.

Section II.A provides an overview of the MAF pipeline, and Sections II.B-G describe the circuit blocks of each stage in detail.

A. MAF Pipeline

In MAF unit 220 as shown in FIG. 5A, pipeline stage 1 can be regarded as an input section and stage 15 as an output section. Stage 1 includes an operand preparation block 502 that, for unary functions, separates operand x into index bits ($x_b$) and offset bits ($x_h$) as described below. Stage 1 also includes an alignment logic block 504 that generates alignment signals (Sh_P1, Sh_P2, Sh_A, Sh_B, Sh_C) used to align values that are to be added, as described below. Stage 15 includes four output control blocks 406 that format the final result for distribution. Output control blocks 406 include control logic for generating special number outputs in the event of overflows, underflows, or special number inputs.

Between stages 1 and 15, MAF unit 220 includes a "product path" 510, a "pixel offset path" 512 and an "addition path" 514 (dotted box). While these names may suggest particular functions, it will become apparent that circuit blocks along the various paths can be leveraged in different ways depending on the operation being performed.

Figure 5B:
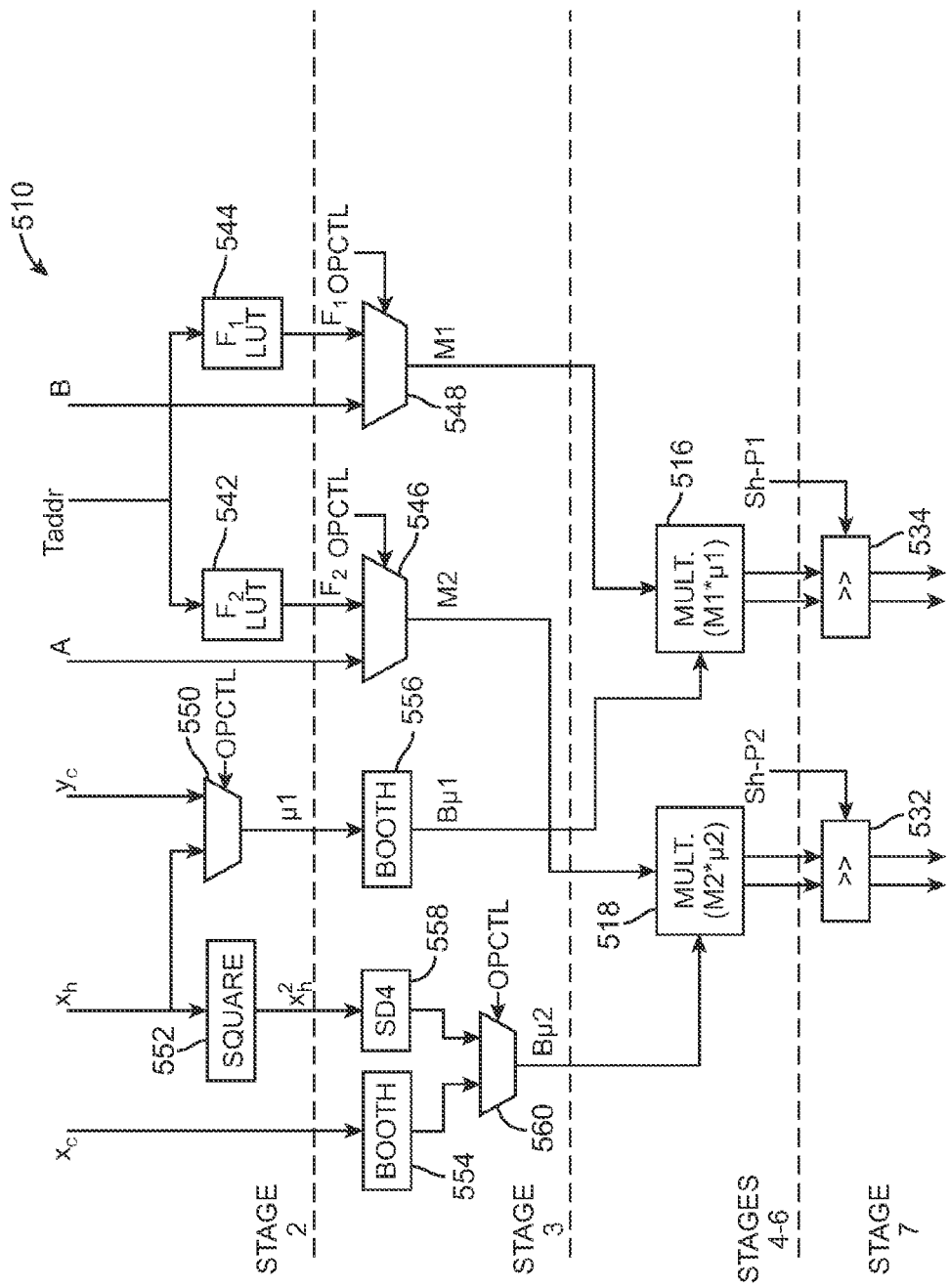
FIG. 5B is a block diagram of a product path for the multipurpose arithmetic functional unit of FIG. 5A.

FIG. 5B is a block diagram of product path 510, also referred to herein as a product pipeline, according to an embodiment of the present invention. Product path 510 includes multiplier blocks 516, 518 for computing products $P1=M1*\mu 1$ and $P2=M2*\mu 2$ (in the generalized notation of Eq. 5), as well as associated selection circuitry for selecting and encoding an appropriate multiplier ($\mu$) and multiplicand (M) for each product based on the operation. Specifically, for PI operations, $M2=A$, $\mu 2=x_c$, $M1=B$, and $\mu 1=y_c$. For UFA operations, $M2=F_2(x_b)$, $\mu 2=x_h^2$, $M1=F_1(x_b)$, and $\mu 1=x_h$, where $x_b$ and $x_h$ are derived from operand x by operand preparation block 502. In other embodiments, different permutations of the multipliers and multiplicands may be selected; for example, the multiplier and multiplicand for an operation might be reversed. The components of product path 510 are described further in Section II.C.

Figure 5C:
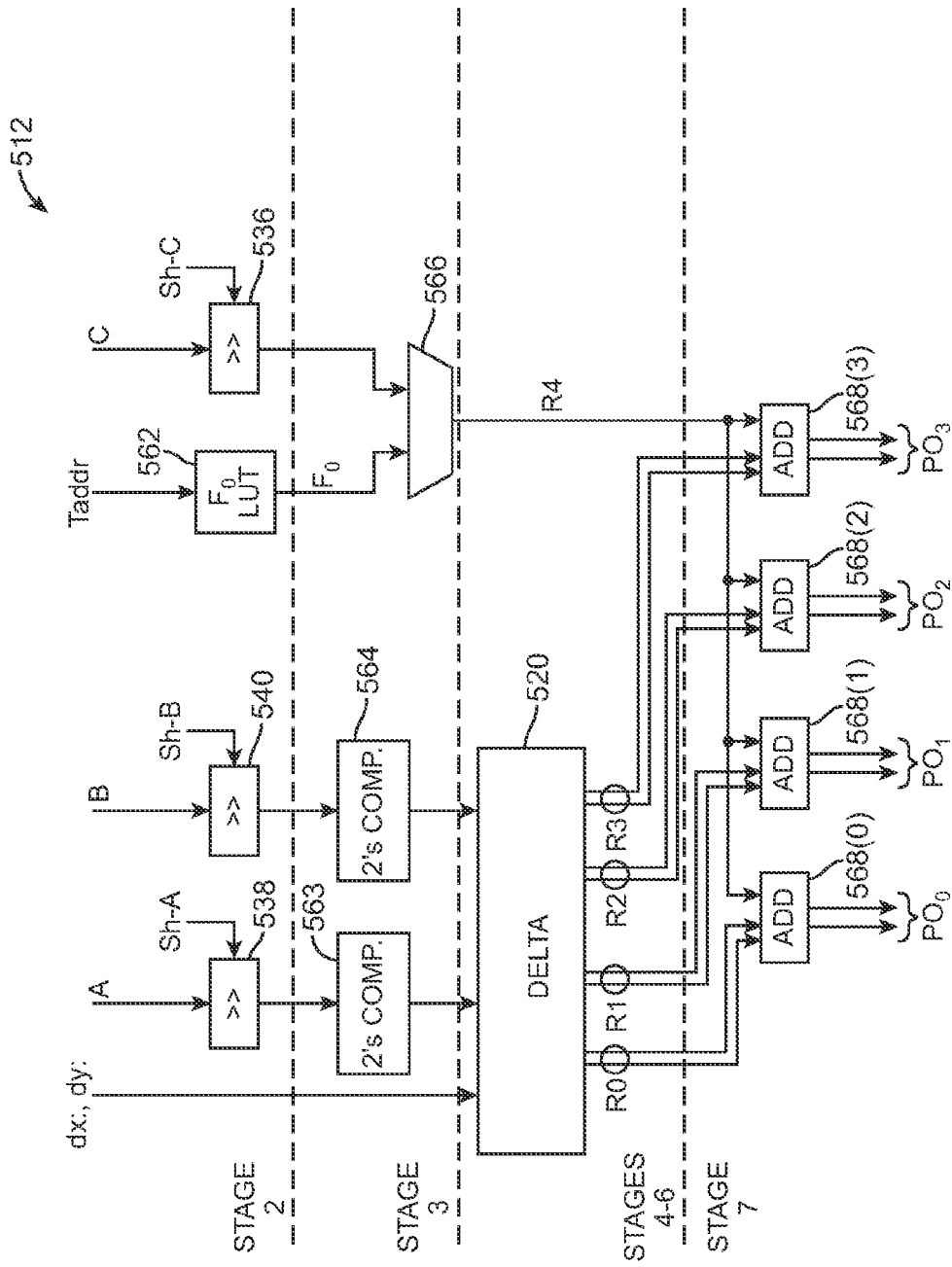
FIG. 5C is a block diagram of an offset path for the multipurpose arithmetic functional unit of FIG. 5A.

FIG. 5C is a block diagram of pixel offset path 512, also referred to herein as an offset path or offset pipeline, according to an embodiment of the present invention. Offset path 512 includes a "delta" block 520 and associated circuitry that, during a PI operation, computes $P0_i=\Delta_i$ (where $\Delta_i$ is given by Eq. 4 above) for each received pixel offset $(dx_i, dy_i)$, where i=0, 1, 2, 3. During a UFA operation, the circuits in pixel offset path 512 compute a coefficient $P0=F_0(x_b)+\beta$, where $\beta$ is a function-specific rounding bias as described in above-referenced application Ser. No. 10/861,184. (In some embodiments, the rounding bias $\beta$ may be omitted.) Pixel offset path 512 supplies four $P0_i$ values, which can be different from each other, to addition path 514. The components of offset path 512 are described further in Section II.D.

Addition path 514 (dotted box in FIG. 5A), also referred to herein as an addition pipeline, includes four parallel sets of add blocks 522, normalization blocks 524, and multiply blocks 526. (Multiple instances of like objects are denoted herein by a reference number followed by a parenthetical instance identifier where appropriate.) Each pipeline receives the products P1 and P2 from product path 510 and a respective one of the four $P0_i$ values from pixel offset path 512. Add blocks 522 each compute a sum $P2+P1+P0_i$ during cycles 7 and 8, producing results $R8_i$. Normalization blocks 524 normalize the results $R8_i$ in cycles 9 and 10, producing results $R9_i$. In cycles 11-14, multiplier blocks 526 may be used to apply perspective correction by multiplying the results $R9_i$ by the interpolated perspective parameter w', or they may be bypassed via multiplexers 528 if perspective correction is not desired.

In addition to these data paths, MAF unit 220 also provides a control path, represented in FIG. 5A by a control block 530 in stage 0. Control block 530 receives the opcode and generates various opcode-dependent control signals, denoted generally herein as "OPCTL," that can be propagated to each circuit block in synchronization with data propagation through the pipeline. (The connection of OPCTL signals into the various circuit blocks is not shown in FIG. 5A.) As described below, OPCTL signals can be used to enable, disable, and otherwise control the operation of various circuit blocks of MAF unit 220 in response to the opcode so that different operations can be performed using the same pipeline elements. The various OPCTL signals referred to herein can include the opcode itself or some other signal derived from the opcode, e.g., by combinatorial logic implemented in control block 530. In some embodiments, control block 530 may be implemented using multiple circuit blocks in several pipeline stages. It is to be understood that the OPCTL signals provided to different blocks during a given operation may be the same signal or different signals. In view of the present disclosure, persons of ordinary skill in the art will be able to construct suitable OPCTL signals.

It should be noted that the circuit blocks for a given stage may require different amounts of processing time and that the time required at a particular stage might vary from one operation to another. Accordingly, MAF unit 220 may also include various timing and synchronization circuits (not shown in FIGS. 5A-5C) to control propagation of data on different paths from one pipeline stage to the next. Any appropriate timing circuitry (e.g., latches, transmission gates, etc.) may be used.

B. Elements in Stage 1

Pipeline stage 1 includes operand preparation block 502 and alignment control block 504.

Figure 6:
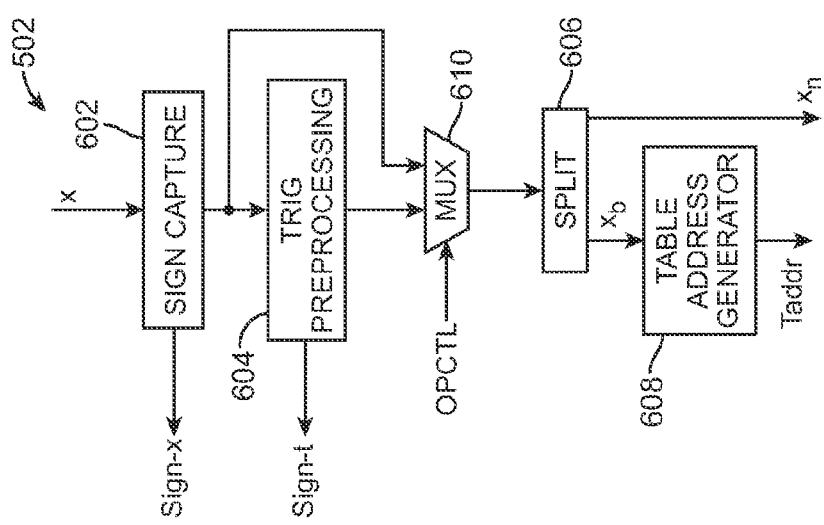
FIG. 6 is a block diagram of an operand preparation block for the multipurpose arithmetic functional unit of FIG. 5A.

FIG. 6 is a block diagram of operand preparation block 502, which includes a sign capture block 602, a trig preprocessing circuit 604, a splitting circuit 606, a table address generator 608, and selection multiplexer (mux) 610. For UFA operations, operand preparation block 502 generates an index for lookup tables that can be used to extract the coefficients $F_2$, $F_1$, $F_0$ (see Eq. 1 above) and an offset value $x_h$. Specifically, sign capture block 602 extracts the sign bit (e.g., the first bit) of operand x and generates a corresponding sign_x signal that is advantageously provided to downstream components for which sign information is required, notably output control blocks 506 in stage 15 (FIG. 5).

Splitting circuit 606 receives an operand x that has 24 mantissa bits (the implied leading 1 can be inserted for fp32 inputs as appropriate) and separates the mantissa bits into m MSBs ($x_b$) and 24-m LSBs ($x_h$). The value of m may be controlled so that different values are used for different unary functions. The MSBs ($x_b$) correspond to a baseline value for the polynomial approximation of Eq. 1 above, and the LSBs ($x_h$) correspond to the offset. As described above, MAF unit 220 advantageously operates on reduced arguments. Except in the case of logarithm operations (described below), exponent bits in operand x are not relevant.

Table address generation circuit 608 uses the baseline value $x_b$ to determine a table address (Taddr) for coefficient lookup tables. In one embodiment, a physically separate lookup table is provided for each supported unary function, and table address Taddr may be just $x_b$. In other embodiments, some or all of the lookup tables are physically combined but logically separate, and Taddr is computed based on the opcode as well as $x_b$ (e.g., by adding an opcode-dependent offset to the baseline value $x_b$). In one embodiment, the lookup tables are implemented such that one address Taddr returns all three coefficients $F_2$, $F_1$, $F_0$ for a function; in other embodiments, table address generation circuit 608 may be configured to provide a different address Taddr for each coefficient.

In some embodiments, operand preparation block 502 also includes trig preprocessing circuit 604, which performs further operand processing in the case of trigonometric UFA operations (e.g., sine and cosine) and is bypassed by selection mux 610 for all other functions. Specifically, trig preprocessing circuit 604 performs a "quadrant reduction" on operand x. As noted above, for SIN and COS operations, the operand is advantageously provided as a fraction $x_R$ in the interval [0, 1). As is well known, sine and cosine functions have a quadrant symmetry such that sin x=sin (π-x), cos x=-cos (π-x), and so on. Thus, if $x_R$ is not in the first quadrant (i.e., range [0, ¼]), sin x or cos x can be computed by determining the sine or cosine of either x or an appropriate supplement of x that is in the first quadrant and choosing the correct sign based on the quadrant of $x_R$. The quadrant of $x_R$ can be determined by examining the two leading bits of the fraction and an appropriate transformation applied, based on the quadrant and whether sine or cosine is being computed. The appropriate sign for the result, which is determined from the quadrant, is propagated on a sign_t signal line. Suitable trig preprocessing circuits are known in the art.

Referring again to FIG. 5A, alignment control block 504 determines the relative alignment for the terms P0, P1, P2. In the case of UFA operations, coefficients $F_2$, $F_1$, $F_0$ are all represented as fixed-point numbers, but operand x is generally a floating-point number with a nonzero exponent, which may require applying a nonzero shift in P2 and/or P1 due to the effect of squaring $x_h$. Alignment control block 504 generates suitable control signals Sh_P2 and Sh_P1 that are applied by shift circuits 532 and 534 at the end of product path 510.

In the case of PI operations, coordinates $x_c$ and $y_c$ are in a fixed-point format, but interpolation parameters A, B, and C are in a floating-point format (e.g., fp32) and may have different orders of magnitude; consequently, alignment shifting of any two of P2, P1, and P0 prior to addition may be needed. Alignment control block 504 generates suitable control signals Sh_P2 and Sh_P1 that are applied by shift circuits 532 and 534 at the end of product path 510 and also generates a control signal Sh_C that is applied to parameter C by shift circuit 536 in pixel offset path 512. Further, the pixel offset computations in delta block 520 may also require alignment shifting; this alignment is achieved by shifting parameters A and B using shift circuits 538, 540 in pixel offset path 512, under the control of Sh_A and Sh_B signals generated by alignment control block 504. Conventional techniques (e.g., exponent comparison) for determining alignment shift amounts may be used.

In some embodiments, alignment shift amounts for planar interpolation operations may be determined upstream of MAF unit 220. For example, in the case of fragment attributes in graphics applications, it is often the case that the same interpolation parameters A, B, C apply to multiple fragments. For efficiency, the shift amounts can be computed elsewhere (e.g., in the same module that generates parameters A, B, C for the attribute) and provided as inputs to MAF unit 220 along with operands A, B, and C.

C. Elements in Product Path

Product path 510 is shown in FIG. 5B. In addition to multipliers 516, 518 and shift circuits 532, 534 referred to above, product path 510 includes lookup tables 542, 544 that provide UFA coefficients $F_2$, $F_1$, respectively; multiplicand (M1, M2) selection muxes 546, 548; a μ1 selection mux 550; a squaring circuit 552; Booth encoders 554, 556; an SD4 recoder 558; and μ2 selection mux 560. These additional circuits operate to generate and select appropriate inputs to multipliers 516, 518 for both UFA and PI operations.

1. Product P2

Product P2 (i.e., M2*μ2 in the notation of Eq. 5) corresponds to $F_2(x_b)*x_h^2$ for UFA operations and to $A*x_c$ for PI operations. To generate multiplicand M2, table address Taddr from operand preparation block 502 is provided to lookup table 542, which returns a corresponding coefficient $F_2$. In one embodiment, the lookup table operation requires all of cycle 2 and part of cycle 3 to complete. At the end of cycle 3, in response to an OPCTL signal, selection mux 546 selects coefficient $F_2$ for UFA operations or operand A for PI operations.

In parallel, to generate multiplier μ2, operand $x_h$ is provided to a squaring circuit 552. During cycle 2, squaring circuit 552, which may be of generally conventional design, squares $x_h$ to generate $x_h^2$. In some embodiments, squaring circuit 552 can be optimized in various ways. For example, in this embodiment, $x_h^2$ is used in approximating a function, and a computation $x_h^2$ with reduced precision (e.g., fewer bits) may be acceptable for this purpose. Where this is the case, one or more LSBs of the input $x_h$ that do not contribute to the reduced precision $x_h^2$ may be dropped, allowing a reduction in the size of squaring circuit 552. Other optimizations exploit the fact that the multiplier and multiplicand are identical operands; consequently, the logic for adding partial products can be simplified as compared to a general purpose multiplier. Such optimizations are known in the art.

During cycle 3, the resulting $x_h^2$ is then recoded into a conventional Booth encoding (e.g., Booth2, radix 4) by sign digit (SD4) recoder 558, which may also be of conventional design; SD4 recoder 558 can convert $x_h$ from a redundant (carry-save) form produced by squaring circuit 552 to Booth-encoded form. In parallel, during cycle 3, operand $x_c$ is also Booth encoded by Booth encoder 554, which may also be of conventional design. At the end of cycle 3, in response to an OPCTL signal, selection mux 560 selects, as Bµ2, Booth-encoded operand $x_h^2$ for unary functions or Booth-encoded operand $x_c$ for planar interpolation operations. In an alternative embodiment, selection between $x_c$ and $x_h^2$ might be made before Booth encoding the selected result.

During cycles 4-6, multiplier 518 computes the product of multiplicand M2 and multiplier Bµ2. Multiplier 518 may be of generally conventional design. In one embodiment, multiplier 518 is a 24×13-bit multiplier circuit that includes a set of Booth multiplexers (e.g., nine 25-bit Booth muxes) followed by a suitable carry-save adder (CSA) tree (e.g., three 27-bit 3:2 CSAs, followed by two 29-bit 3:2 CSAs, followed by one 35-bit 4:2 CSA). In some embodiments, the final product P2 is provided in a redundant carry-save form (indicated herein by P1c, P2s); in other embodiments, multiplier 518 further includes a conventional carry propagation adder (CPA) that combines the carry and save results into a final non-redundant form. Other multipliers may also be used.

Multiplier 518 is advantageously configured to handle the different operand formats used for UFA and PI operations. For UFA operations, the operand $x_h^2$ is in a sign-magnitude form while the coefficient $F_2$ (which might be positive or negative) could be stored in either two's complement or sign-magnitude form. For PI operations, coordinate $x_c$ is in a fixed-point, two's complement form while parameter A has a 24-bit mantissa in sign-magnitude form.

In one embodiment, to facilitate handling UFA and PI operations by the same multiplier, coefficients $F_2$, $F_1$, $F_0$ are stored in the lookup tables in two's complement form. Use of the two's complement representation can support a more compact Booth multiplier. For instance, given that $x_h^2$ is unsigned, it follows that in Booth multiplication the final partial product would always be non-complemented (i.e., the Booth algorithm selects either $+F_2$ or 0). If the multiplier is represented in sign-magnitude form, a negative multiplier would require inversion and adding 1 in the LSB. In some instances, this could undesirably extend the height and/or critical path of the multiplier tree. In other embodiment, e.g., where the resulting height of the multiplier tree would be acceptable or where the tree implements a different multiplication algorithm, coefficients $F_2$, $F_1$, $F_0$ may be stored in sign-magnitude format.

For PI operations, the sign bit of parameter A can be provided to the partial product generator and used to invert the sign of the Booth partial products where appropriate. For instance, if the Booth algorithm would normally select −2A, then 2|A| should be chosen in the event that A is less than zero and vice versa. In addition, any zero term is forced to "positive" zero (all zeroes) rather than "negative" zero (all ones). Under these conditions, multiplier 518 generates correct sign extensions for all partial products and therefore correct results. It is to be understood that the present invention is not limited to particular operand formats or particular multiplier circuit designs.

At the end of cycle 6, shift circuit 532 applies the right shift indicated by the Sh_P1 control signal as an arithmetic shift to P2. As is known in the art, an arithmetic right shift requires sign extending the bit field, inserting leading zeroes for positive numbers and leading ones for negative numbers. In some embodiments, an arithmetic shift can be applied to P2c and P2s in redundant form. This is done using combinatorial logic based on the respective MSBs of P2c and P2s and the desired sign of the product P2, which is known because the respective signs of the factors M2 and µ2 are known. For example, for n-bit P2s and P2c, suppose that the product is known to be negative, and the MSBs $P2s_{n-1}$ and $P2c_{n-1}$ are both zero. In this case, a negative sign (1) in the nth bit position can be obtained by using the sign extensions $P2s_n=0$ and $P2c_n=1$ (or vice versa). Other cases can be resolved using similar logic. In one embodiment, the sign-extension bit for P2s is set to 1 if the product is negative and to the logical OR of $P2s_{n-1}$ and $P2c_{n-1}$ otherwise, while the sign-extension bit for P2c is set to 0 if the product is non-negative and to the logical AND of $P2s_{n-1}$ and $P2c_{n-1}$ otherwise. Different conventions may also be used. In another embodiment, P2 is in non-redundant form and a conventional arithmetic shift circuit may be used.

The resulting shifted P2 (in redundant or non-redundant form, as desired) is provided to addition path 514.

2. Product P1

Product P1 (M1*µ1) corresponds to $F_1(x_b)*x_h$ for unary functions and to $B*y_c$ for planar interpolation. To generate multiplicand M1, table address Taddr from operand preparation block 502 is provided to lookup table 544, which returns a corresponding coefficient $F_1$. In one embodiment, the lookup table operation requires all of cycle 2 and part of cycle 3 to complete. At the end of cycle 3, in response to an OPCTL signal, selection mux 548 selects coefficient $F_1$ for UFA operations or operand B for PI operations.

In parallel, to generate multiplier µ1, during cycle 2, µ1 selection mux 550 selects operand $x_h$ for unary functions or operand $y_c$ for planar interpolation operations. During cycle 3, the selected operand µ1 is Booth encoded to produce a multiplier Bµ1.

During cycles 4-6, multiplier 516 computes the product of multiplicand M1 and multiplier Bµ1. Multiplier 516 may be of similar design to multiplier 518 described above and may provide the final product in a redundant (carry-save) form as results P1c and P1s. In other embodiments, multiplier 516 may include a conventional carry propagation adder (CPA) that combines the carry and save results into a final non-redundant form.

At the end of cycle 6, shift circuit 534 applies the right shift indicated by the Sh_P1 control signal as an arithmetic shift to P1, similarly to shift circuit 532 described above. The resulting shifted P1 (in redundant or non-redundant form, as desired) is provided to addition path 514.

It should be noted that the arrangement described herein in which multiplier 518 computes either $F_2*x_h^2$ or $A*x_c$ could be replaced by a different arrangement, e.g., where multiplier 518 computes either $F_2*x_h^2$ or $B*y_c$.

D. Elements in Pixel Offset Path

Pixel offset path 512, as shown in FIG. 5C, includes shift circuits 536, 538, 540; two's complement circuits 563, 564; lookup table 562; selection mux 566; delta block 520; and four adder circuits 568. These circuits cooperate to compute four $\Delta_i$ values according to Eq. 3 for PI operations and a biased coefficient $F_0(x_b)+\beta$ for UFA operations. Specifically, during PI operations, delta block 520 computes $A*dx_i+B*dy_i$ for each offset ($tdx_i$, $dy_i$); during UFA operations, delta block 520 produces the rounding bias β. Adders 568 add the results from delta block 520 to planar interpolation parameter C or approximation coefficient $F_0(x_b)$ as appropriate.

As noted above, operands A and B are aligned prior to multiplication by the pixel offsets using right shift circuits 538, 540 during cycle 2. Right shift circuits 538, 540, which may be of generally conventional design, receive respective signals Sh_A and Sh_B, which may be generated by alignment control block 504 or by a component upstream of MAF unit 220 as described above. During cycle 3, two's complement circuits 563, 564 compute the two's complement of shifted operands A and B, respectively, if the operand is negative. In one embodiment, two's complement circuits 563, 564 are implemented using an inverter followed by an increment circuit that adds 1 to the LSB (thereby forming the two's complement) followed by a multiplexer that selects between the two's complement and the non-inverted input. The resulting values $A_{sh}$ and $B_{sh}$ are provided to delta block 520.

Figure 7:
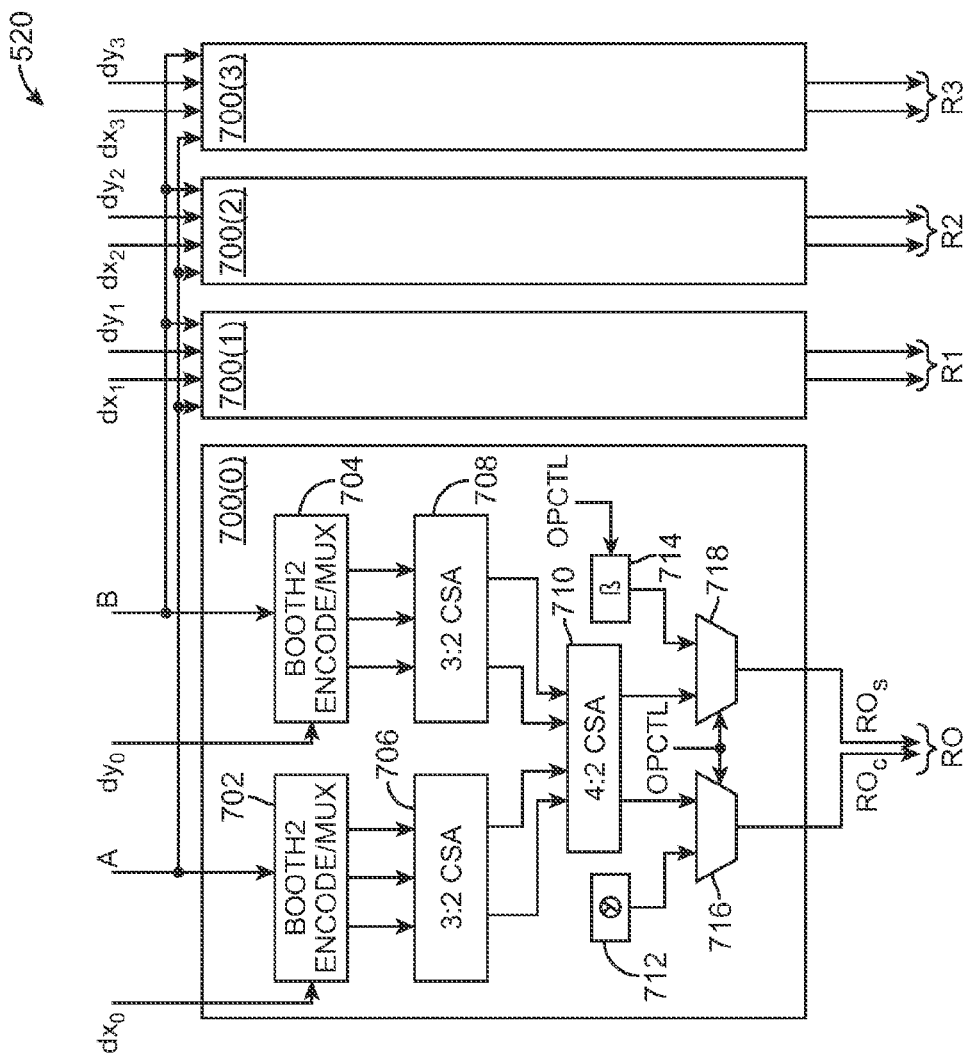
FIG. 7 is a block diagram of a delta block for the offset path of FIG. 5C.

FIG. 7 is a block diagram of delta block 520, which operates during cycles 4-6. As shown, delta block 520 includes four parallel multiply-add paths 700 for computing $A_{sh}*dx_i + B_{sh}*dy_i$. In FIG. 7, only path 700(0) is shown in detail; it is to be understood that the other three paths 700(1)-700(3) may contain identical components. Path 700(0) includes two Booth encoder/muxes 702, 704; two 3:2 carry-save adders (CSAs) 706, 708; one 4:2 CSA 710; a zero register 712, a β register 714; and output selection muxes 716, 718.

During cycle 4, Booth encoder/mux 702, which may be of generally conventional design, receives multiplicand A and multiplier $dx_0$ and computes three partial products. Booth encoder/mux 704 receives multiplicand B and multiplier $dy_0$ and computes another three partial products. During cycle 5, the partial products from Booth mux 702 are added in 3:2 CSA 706 while the partial products from Booth mux 704 are added in 3:2 CSA 708. During cycle 6, 4:2 CSA 710 adds the respective redundant-form results from CSAs 706, 708, producing a redundant-form result that is provided to output selection muxes 716, 718 via paths 720, 722.

Muxes 716, 718 respond to an OPCTL signal that indicates whether a UFA or PI operation is in progress. For PI operations, the results on paths 720, 722 are selected as result R0 (R0c, R0s in redundant form). For UFA operations, mux 716 selects a zero value provided by register 712 while mux 718 selects a bias value β that is provided by register 714. In general, different UFA operations may use different biases; the correct bias can be selected from register 714 based on an OPCTL signal indicating which UFA operation is being executed. Paths 700(1)-700(3) advantageously operate in a parallel manner with different pixel offsets to produce respective results R1, R2, R3.

Referring again to FIG. 5C, during cycles 2 and 3, the term to be added to the results from delta block 520 is prepared. Specifically, lookup table 562 receives the table address Taddr from operand preparation block 502 and returns a corresponding coefficient $F_0$. In parallel, operand C is right shifted by right shift circuit 536. Right shift circuit 536, which may be of generally conventional design, receives the control signal Sh_C, which may be generated by alignment control block 504 or by a component upstream of MAF unit 220 as described above. During cycle 3, selection mux 566 selects, as a result R4, coefficient $F_0$ for a unary operation or operand C for planar interpolation.

During cycle 7, each of adders 568(0)-568(3) receives result R4 and a respective one of results R0—R3 from delta block 520 as shown. Each adder 568 may be implemented as a 3:2 CSA that produces a result $P0_i$ in redundant form. The four $P0_i$ values are provided to addition path 514.

E. Elements in Addition Path

Addition path 514, as shown in FIG. 5A, includes four add blocks 522, four normalization blocks 524, and four multiply blocks 526.

Figure 8:
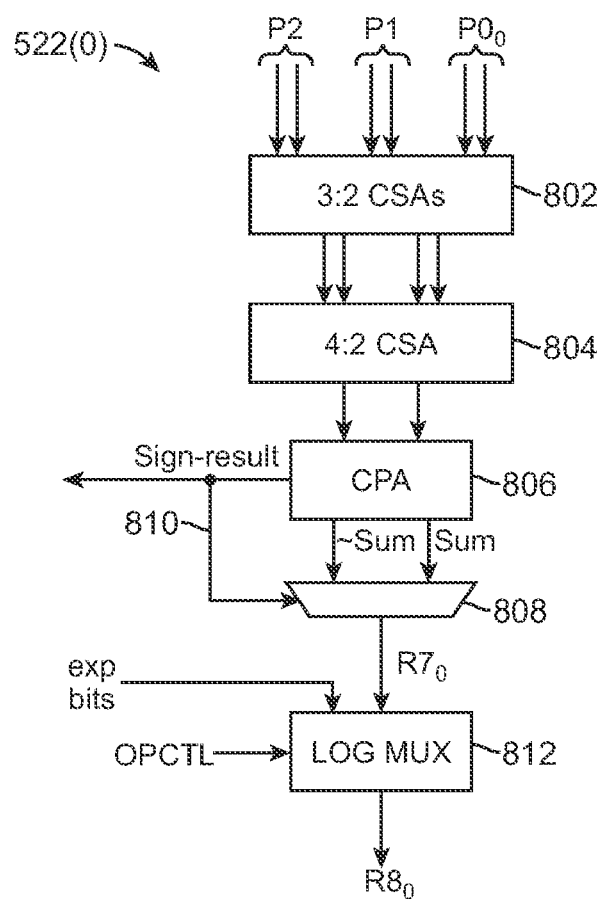
FIG. 8 is a block diagram of an add block for the multipurpose arithmetic functional unit of FIG. 5A.

FIG. 8 is a block diagram of a representative add block 522(0) that receives redundant-form results P2, P1 and $P0_0$ and computes the sum during cycles 7 and 8. In this example, add block 522(0) computes the sum using two 3:2 CSAs 802 followed by one 4:2 CSA 804 followed by one carry propagation adder (CPA) 806 that computes the result in non-redundant form and provides Sum and inverse Sum (denoted ~Sum) outputs. CSAs 802, 804 and CPA 806 may be of conventional design.

The final result for UFA and PI operations is expressed in sign-magnitude format, but the multipliers and adders described herein produce results in two's complement format. Accordingly, selection mux 808 selects the Sum output as a result $R7_0$ if the sign_result signal on path 810 indicates that the output of CPA 806 is a positive result and the ~Sum output if the sign_result signal indicates a negative result. In one embodiment, the sign_result signal is just the MSB of the Sum output and is zero (one) for a positive (negative) result. While selecting the ~Sum output is not a true two's complement, the off-by-one error is generally not important in embodiments where PI and UFA operations both involve a degree of approximation. If desired, a plus-1 adder could be used to add 1 to the ~Sum result and obtain the two's complement result.

Log mux 812 passes through the result $R7_0$ from selection mux 808 unmodified unless the OPCTL signal indicates that a LOG operation is in progress. In that event, log mux 812 adds the exponent of the original floating-point operand x to the result $R7_0$. The result $R8_0$ is passed to normalization block 524. The implementation of add blocks 522(1)-522(3) may be identical to add block 522(0).

Referring again to FIG. 5A, during cycles 9 and 10, normalization blocks 524($i$) left-shift the results R8, to place a "1" in the leading mantissa position. Normalization blocks 524($i$) may be of generally conventional design, and a detailed description is omitted.

During cycles 11-14, multiply blocks 526($i$), which may be of generally conventional design, may be used to multiply the normalized results $R9_i$ by a perspective parameter w', to support perspective-correct interpolation. Where perspective correction is not desired, multiply blocks 526 can be bypassed using selection muxes 528. For instance, multiply blocks 526 may be active during IPAW operations and inactive (bypassed) during IPA and all UFA operations.

For efficiency, perspective parameter w' can be computed once for each fragment and stored in a register (not shown) or other location accessible to multiply blocks 526. For example, the reciprocal (1/w) of the homogeneous coordinate w for vertices of a primitive can be computed by MAF unit 220 executing one or more RCP operations. Next, 1/w can be interpolated for a fragment location (or group of four fragment locations) by MAF unit 220 executing an IPA operation to determine 1/w'. Finally, the reciprocal of 1/w' (which is w') is computed by MAF unit 220 executing another RCP operation. It should be noted that each multiply block 526(0)-526(3) can store and use a different w' value.

F Elements in Stage 15

Figure 9:
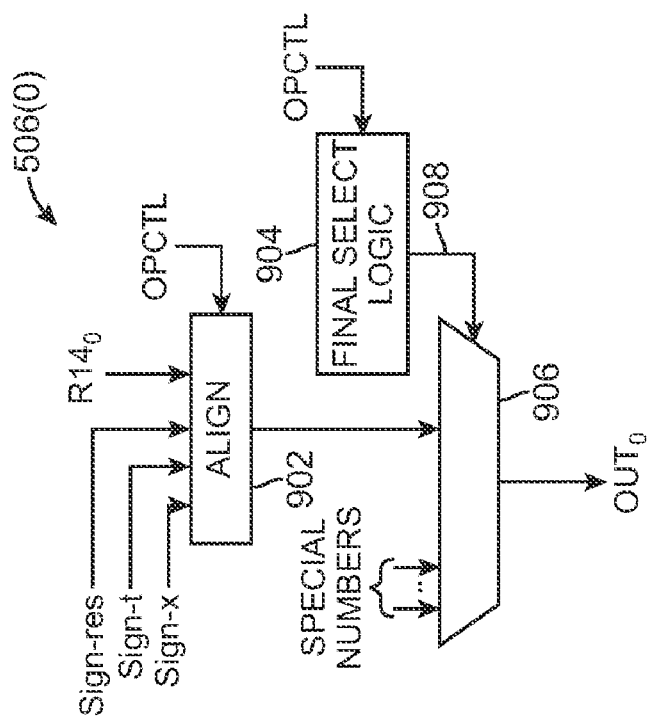
FIG. 9 is a block diagram of an output control block for the multipurpose arithmetic functional unit of FIG. 5A.

FIG. 9 is a block diagram of a representative output control block 506(0). An alignment circuit 902 receives the result $R14_0$ from selection mux 528(0), the sign_result signal from CPA 806, and the sign_t signal from trig preprocessing block 604 (FIG. 6). Based on this information, alignment circuit 902 performs final alignment, including setting a sign bit for the result and, in some instances, dropping a leading "1" for compatibility with an fp32 output format.

Final selection logic 904 determines whether the result $R14_0$ should be overridden by any of various "special number" results (e.g., overflows, zero) that may be defined. The determination may be based on considerations such as whether any of the inputs was an fp32 special number (overflow, underflow), or whether overflows or underflows occurred in the arithmetic pipeline. For example, any underflow might be flushed to zero and any overflow to a maximum (or "infinite") value. Conventional logic circuits for detecting such conditions may be implemented in final selection logic 904 and/or in earlier pipeline stages (e.g., stage 1). Output mux 906 selects the pipeline result from alignment circuit 902 or one of the special numbers in response to a signal on line 908 generated by final selection logic 904.

Referring again to FIG. 5A, the final results are provided on paths $OUT_0$-$OUT_3$. In one embodiment, each result includes only a 24-bit sign and mantissa; the exponent portion may be determined by separate processing circuits of conventional design and appended to the result at a downstream processing stage using conventional post-processing circuits.

G. Bypass Paths

Not all components of MAF unit 220 are necessary for all operations. For example, during PI operations, lookup tables 542, 544, and 562 and squaring circuit 552 are not needed; during UFA operations, the multipliers and adders in delta block 520 are not needed; and during all operations except IPAW, perspective correction multipliers 526 are not needed. As described above, bypass paths are provided around such components using various selection muxes. When a particular circuit block is bypassed during an operation, that block may be set into an inactive state to reduce power consumption or allowed to operate normally with its output being ignored.

It will be appreciated that the MAF unit described herein is illustrative and that variations and modifications are possible. Many of the circuit blocks described herein provide conventional functions and may be implemented using techniques known in the art; accordingly, detailed descriptions of these blocks have been omitted. The division of operational circuitry into blocks may be modified, and blocks may be combined or varied. In addition, the number of pipeline stages and the assignment of particular circuit blocks or operations to particular stages may also be modified or varied. The selection and arrangement of circuit blocks for a particular implementation will depend in part on the set of operations to be supported, and those skilled in the art will recognize that not all of the blocks described herein are required for every possible combination of operations.

III. Examples of MAF Unit Operations

MAF unit 220 advantageously leverages the circuit blocks described above to support PI and UFA operations in an area-efficient manner. Accordingly, the operation of MAF unit 220 depends in at least some respects on which operation is being executed. Section III.A describes the use of MAF unit 220 to perform UFA operations, and Section III.B describes PI operations.

A. Unary Function Approximation (UFA) Operations

For UFA operations, MAF unit 220 receives operand x and an opcode indicating which unary function is to be performed. As described above, operand x is advantageously received in a reduced form.

During cycle 1, operand preparation block 502 generates a table address Taddr and an offset $x_h$ from operand x. In addition, for trigonometric functions, operand preparation block 502 may also perform quadrant reduction as described above. Alignment control circuit 504 determines, based on operand x, whether shifting of products P1 or P2 will be needed and generates appropriate Sh_P1 and Sh_P2 signals.

During cycle 2, the table address Taddr is provided to lookup tables 542, 544, and 562, which return the appropriate coefficients $F_2$, $F_1$, and $F_0$. It should be noted that lookup tables for different coefficients and different unary functions may be physically or logically separated, and that any addressable storage device or circuit may be operated as a "lookup table" in this context. The lookup table mechanism may also include translation circuitry for converting the received Taddr signal to a usable address, or the Taddr signal may be provided in a suitable format so that further translation is not required. Nonvolatile storage (e.g., a conventional ROM) is advantageously used so that coefficients need not be reloaded every time system power is restored, but volatile storage (e.g., RAM) could also be used if desired.

Also during cycle 2, offset $x_h$ is squared in squaring circuit 552 to provide $x_h^2$. In some embodiments, the squaring operation may extend into cycle 3. In parallel, μ1 selection mux 550 selects offset $x_h$.

During cycle 3, multiplier $x_h^2$ is Booth encoded by SD4 recoder 558, and multiplier $x_h$ is Booth encoded by Booth encoder 556. At the end of cycle 3, selection mux 560 selects Booth-encoded $x_h^2$ as Bμ2. Multiplicand selection muxes 546, 548, and 566 select coefficients $F_2$, $F_1$, and $F_0$ respectively.

During cycles 4-6, multiplier 518 computes $P2=F_2*x_h^2$ and multiplier 516 computes $P1=F_1*x_h$; these products may be provided in redundant or non-redundant form as described above. In pixel offset section 512, coefficient $F_0$ passes through on the R4 path. In delta block 520 (FIG. 7), selection muxes 716, 718 select the values 0 and β, respectively, for the R0c and R0s paths. In some embodiments, rounding bias β might not be used; in that case, zeroes would be applied to both the R0c and R0s paths. It should be noted that the same values applied to the R0c and R0s paths may also be applied to the other output paths R1c, R1s, R2c, R2s, R3c, R3s of delta block 520.

During cycle 7, right shift circuits 532 and 534 apply right shifts to results P2 and P1 in response to the Sh_P2 and Sh_P1 signals from alignment control block 504. Shifting may be applied to redundant or non-redundant forms of P2 and P1 as described above. Adder 568(0) adds the R0c and R0s signals from delta block 520 to coefficient $F_0$ from the R4 path, producing result $P0_0$ in carry-save form. Shifted P2 and P1 and result $P0_0$ are supplied to adder 522(0). It should be noted that, in parallel, adders 568(1)-568(3) can compute the same sum as adder 568(0) and that shifted P2 and P1 and results $P0_1$-$P0_3$ can be supplied to adders 522(1)-522(3).

During cycle 8, adder 522(0) completes the computation of $P2+P1+P0_0$, converts the result to a magnitude representation and, in the case of a LOG operation, adds the exponent. During cycles 9 and 10, normalization block 524(0) normalizes the result $R8_0$ to produce result $R9_0$. The same operations may occur in parallel in adders 522(1)-522(3) and normalization blocks 524(1)-524(3).

Perspective correction is generally not applicable to UFA operations, and accordingly, multiplier 526(0) in cycles 11-14 may be bypassed using selection mux 528(0). The bypass path may include timing circuitry for delaying propagation of the result by an appropriate number of cycles, or those cycles may be skipped, making the MAF pipeline effectively shorter for unary operations. Again, multipliers 526(1)-526(3) and selection muxes 528(1)-528(3) can parallel the operation of multiplier 526(0) and mux 528(0).

In some embodiments, multiplier 526(0) might be leveraged to scale a unary function result ƒ(x) by some scale factor p. For example, a scale factor p could be supplied as an additional operand and bypassed into multiplier 526(0) in place of w'; multiplier 526(0) would then compute p*ƒ(x).

During cycle 15, output control circuit 506(0) formats and selects the appropriate result for propagation on path $OUT_0$.

In parallel, the same result may appear on output paths $OUT_1$-$OUT_3$. In some embodiments, rather than generating duplicate results, only one of the four parallel pipelines might be active during UFA operations.

In one embodiment, it is desirable for issue circuit 204 (FIG. 2) to issue up to four UFA instructions for MAF unit 220 in one clock cycle, with all four results arriving simultaneously on data transfer path 226 after some number of clock cycles. For example, a single opcode identifying a UFA instruction might be issued together with four operands x on which the UFA operation is to be executed, with results appearing on data transfer path 226 15 clock cycles later. Where MAF unit 220 can perform only one set of table lookups per clock cycle, input and output sequencing logic can be provided to implement this desired behavior.

Figure 10:
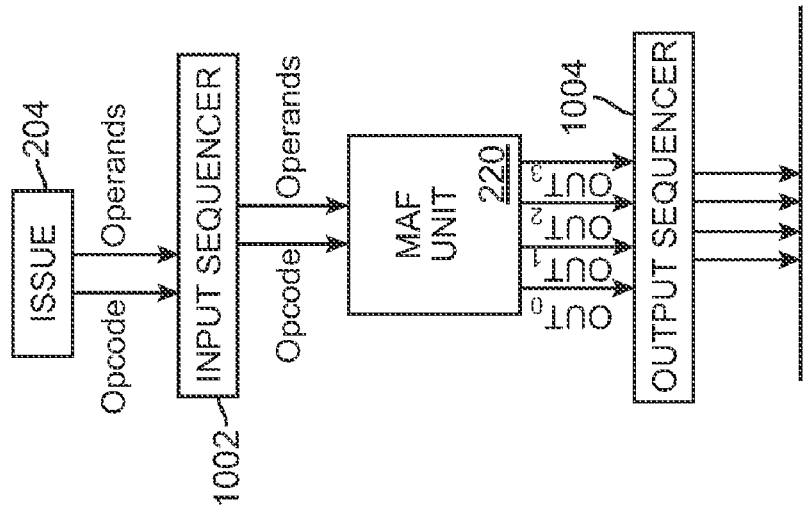
FIG. 10 is a block diagram of a multipurpose arithmetic functional unit with input and output sequencing logic according to an embodiment of the present invention.

More specifically, FIG. 10 is a block diagram showing a MAF unit 220 that is enhanced with sequencing logic. Input sequencing logic 1002 is disposed between issue unit 204 and MAF unit 220 and receives the opcode and four operands x0, x1, x2, x3 from issue unit 204. On each of the next four clock cycles, input sequencing logic 1002 forwards the opcode and one of the four operands to stage 1 of MAF unit 220. Conventional circuits for latching and forwarding data with controlled delay may be used.

Output sequencing logic 1004 is disposed between MAF unit 220 and result path 226. Output sequencing logic 1004 latches results from the four operations and, when all four have been collected, forwards the results together onto path 226. In some embodiments, MAF unit 220 may use just one of the four parallel pipelines in addition path 514 (FIG. 5) to process all four operations. Alternatively, if each operation result appears on all four output paths $OUT_0$-$OUT_3$, output sequencing logic 1004 may be configured to latch a result from $OUT_0$ during one clock cycle, the result from $OUT_1$ on the next cycle, and so on until results from all four output paths have been latched. For each of the four operations, one or all of the pipeline paths might be active. As with input sequencing logic 1002, conventional circuits for latching and forwarding data with controlled delay may be used.

B. Planar Interpolation (PI) Operations

For PI operations, MAF unit 220 receives parameters A, B, C and quad center coordinates ($x_c$, $y_c$). In some embodiments, MAF unit 220 also receives four coordinate offsets ($dx_i$, $dy_i$), which may be in either signed or unsigned format. In other embodiments, the coordinate offsets ($dx_i$, $dy_i$) may be preselected and stored in MAF unit 220 rather than being supplied as operands.

During cycle 1, alignment control circuit 504 determines shift amounts for products P1 and P2, as well as for parameters A, B and C, and generates appropriate Sh_P1, Sh_P2, Sh_A, Sh_B, and Sh_C signals. As described above, where $x_c$ and $y_c$ are fixed-point numbers while A, B and C are floating-point numbers, the shift amounts will depend only on the respective exponents of A, B and C. Thus, in some embodiments, some or all of these shift signals may be determined at the time A, B and C are computed (or at some other time prior to issuing the PI instruction to MAF unit 220) and provided to MAF unit 220 with the operands.

During cycle 2, shift circuits 538, 540, and 536 apply shifts determined by the Sh_A, Sh_B, and Sh_C signals to parameters A, B and C. The µ1 selection mux 550 selects operand y. Lookup tables 542, 544, 562 might or might not be accessed; any returned value will be ignored.

During cycle 3, operand $x_c$ is Booth encoded by Booth encoder 554 and selected as multiplier Bp2 by selection mux 560. Operand $y_c$ is Booth encoded by Booth encoder 556 and provided as multiplier Bµ1. Operands A and B are selected as multiplicands M2 and M1, respectively, by selection muxes 546, 548. Shifted operand C is selected as result R4 by selection mux 566.

During cycles 4-6, multiplier 518 computes P2=A*$x_c$ and multiplier 516 computes P1=B*$y_c$; these products may be provided in redundant or non-redundant form, as described above. In pixel offset section 512, shifted parameter C passes through on the R4 path. In path 700(0) of delta block 520 (FIG. 7), Booth encoder/mux 702 multiplies shifted parameter A by coordinate offset $dx_0$ while Booth encoder/mux 704 multiplies shifted parameter B by coordinate offset $dy_0$. The 4:2 CSA 710 adds A*$dx_0$+B*$dy_0$, and selection muxes 716, 718 select the redundant-form result as R0c, R0s. Paths 700(1)-700(3) perform parallel operations for the other coordinate offsets ($dx_i$, $dy_i$).

During cycle 7, right shift circuits 532 and 534 apply right shifts to results P2 and P1 in response to the Sh_P2 and Sh_P1 signals from alignment control block 504. Shifting may be applied to redundant or non-redundant forms of P2 and P1 as described above. Adder 568(0) adds the R0c and R0s signals from delta block 520 to shifted parameter C from the R4 path, producing result $P0_0$ (which is $\Delta_0$ of Eq. 4) in carry-save form. Shifted P2 and P1 and result $P0_0$ are supplied to adder 522(0). In parallel, adders 568(1)-568(3) compute the corresponding delta terms $A_i$ for the other pixel offsets, and shifted P2 and P1 are supplied to adders 522(1)-522(3) together with one of the results $P0_1$-$P0_3$.

During cycle 8, adders 522(i) each complete the computation of their respective P2+P1+$P0_i$, converting the result to a magnitude representation. During cycles 9 and 10, normalization blocks 524(i) normalize the results $R8_i$ to produce results $R9_i$.

For IPAW operations, perspective correction is applied using multipliers 526(i) in cycles 11-14. As described above, IPAW operations are advantageously performed after the perspective coordinate w has been interpolated and the interpolated value w' has been stored in an appropriate register. Where interpolation of w is performed using an IPA operation in MAF unit 220, a different w' corresponding to each pixel offset may be provided.

For IPA operations, perspective correction is not applied, and multipliers 526(i) in cycles 11-14 are advantageously bypassed using selection muxes 528(i). The bypass path may include timing circuitry for delaying propagation of the result by an appropriate number of cycles.

During cycle 15, output control circuits 506(i) format and select the appropriate result for propagation on paths $OUT_0$-$OUT_3$.

In embodiments which include input and output sequencing logic (e.g., FIG. 10), this logic advantageously is not used to sequence the IPA and IPAW operations; all four values can be computed in parallel. Accordingly, when the OPCTL signals provided to input sequencing logic 1002 and output sequencing logic 1004 indicate planar interpolation, these circuits may operate in a pass-through or bypass mode.

IV. Further Embodiments

While the invention has been described with respect to specific embodiments, one skilled in the art will recognize that numerous modifications are possible. For instance, a MAF unit may be implemented to support more, fewer, or different functions in combination and to support operands and results in any format or combinations of formats.

In one alternative embodiment, MAF unit 220 leverages multipliers 526(i) as general-purpose multiplication circuits to support a floating point or integer multiply (MUL) operation in addition to the UFA and PI operators described above. In one embodiment, the MUL operation for operands (factors) $a_1$ and $a_2$ is implemented by bypassing the operands into one of multiplier blocks 526 (FIG. 5).

Figure 11:
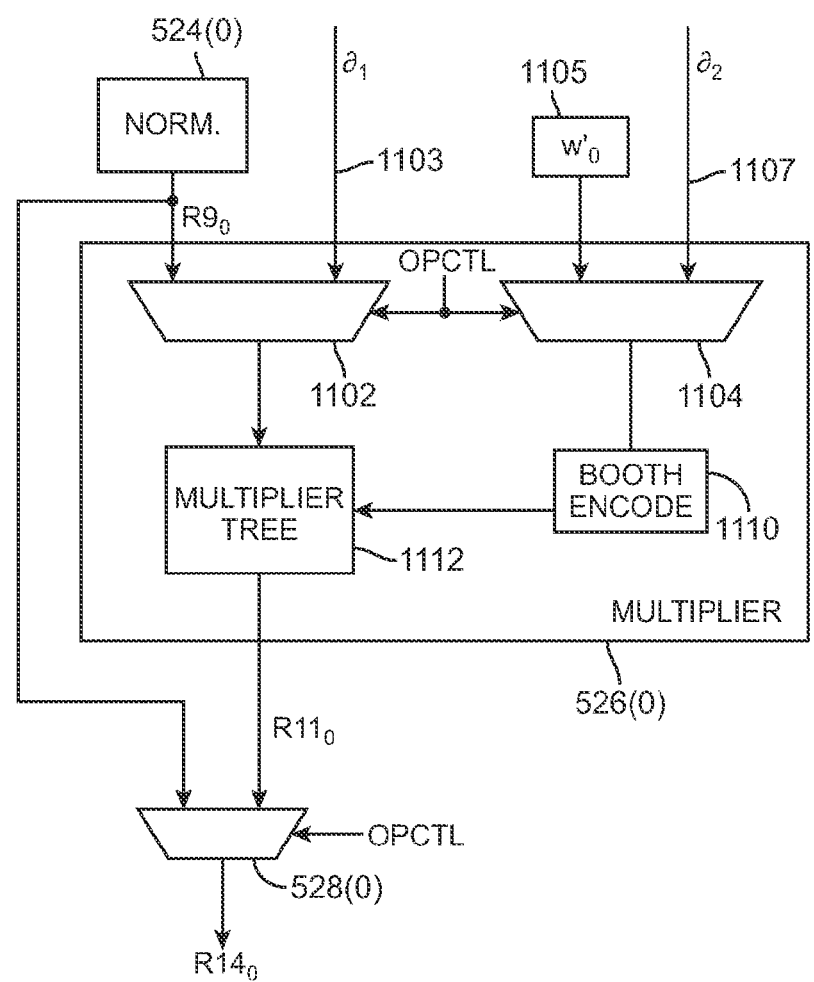
FIG. 11 is a block diagram of a multiplier block that supports a MUL operation in addition to the IPAW operation.

More specifically, FIG. 11 is a block diagram of a multiplier block 526(0) that supports a MUL operation in addition to the IPAW operation. Selection mux 1102 operates to select either result $R9_0$ from normalization unit 524(0) or factor $a_1$ from an operand input path 1103, and selection mux 1104 operates to select either perspective parameter $w_0'$ from a register 1105 or factor $a_2$ from an operand input path 1107. Selection muxes 1102, 1104 are advantageously operated in response to a common OPCTL signal so that $a_1$ and $a_2$ are selected in the case of a MUL operation and $R9_0$ and $w_0'$ are selected in the case of an IPAW operation. For other operations, selection mux 528(0) selects result R90, and the operation of selection muxes 1102, 1104 is irrelevant to the final result. In some embodiments, multiplier 526(0) may be in a low-power idle state during operations where its result is not selected.

A Booth encoder 1110 encodes the selected multiplier (either $\alpha_2$ or $w'_0$), and a multiplier tree 1112 performs the multiplication. The result $R11_0$ is provided to multiplexer 528(0) as shown in FIG. 5.

Multipliers 526(1)-526(3) may be configured similarly to multiplier 526(0), and MAF unit 220 in this embodiment may support parallel execution of up to four MUL operations using different operands.

In another alternative embodiment, MAF unit 220 may also support a general quadratic polynomial operation that computes $a_2*x^2+a_1*x+a_0$ for arbitrary coefficients $a_2$, $a_1$, $a_0$, which can be supplied on the same paths as parameters A, B, and C. MAF unit 220 might also be extended to support interpolation in three dimensions, cubic polynomial computations and so on.

In addition, while the MAF unit described herein supports parallel computation of PI operations for four (x, y) locations in parallel, it will be appreciated that parallel PI operations for any number of locations (including just one location or more than four locations) could be supported. In addition, the parallel computation paths for PI operations can be leveraged to support parallel execution of other operations, such as UFA or MUL operations.

Further, instead of supplying the interpolation parameters A, B, and C as operands together with the PI opcode and (x, y) operands as described above, these parameters might be provided to the MAF unit in advance and stored by the MAF unit, e.g., in internal state registers, for use in subsequent PI operations. A special opcode may be used to signal the MAF unit to store or update these parameter values.

The various bypass paths and pass-throughs described herein may also be varied. In general, where a bypass path around any circuit block is described, that path may be replaced by an identity operation (i.e., an operation with no effect on its operand, such as adding zero or multiplying by one) in that block and vice versa. A circuit block is bypassed during a given operation may be placed into an idle state (e.g., a reduced power state) or operated normally with its result being ignored by downstream blocks, e.g., through operation of selection muxes or other circuits.

The division of the MAF pipeline into stages is arbitrary. The pipeline may include any number of stages, and the combination of components at each stage may be varied as desired. Functionality ascribed to particular blocks herein may also be separated across pipeline stages; for instance, a multiplier tree might occupy multiple stages.

The functionality of various blocks may also be modified. In some embodiments, for example, different adder circuits or multiplier circuits may be used, and use of Booth2 encoding (or any other encoding) for multiplication is not required.

In addition, the MAF unit has been described in terms of circuit blocks to facilitate understanding; those skilled in the art will recognize that the blocks may be implemented using a variety of circuit components and layouts and that blocks described herein are not limited to a particular set of components or physical layout. Blocks may be physically combined or separated as desired.

A processor may include one or more MAF units in an execution core. For example, where superscalar instruction issue (i.e., issuing more than one instruction per cycle) is desired, multiple MAF units may be implemented, and different MAF units may support different combinations of functions. A processor may also include multiple execution cores, and each core may have its own MAF unit(s).

Further, while the invention has been described with reference to a graphics processor, those skilled in the art will appreciate that the present invention may also be employed in other processors such as math co-processors, vector processors, or general-purpose processors.

Thus, although the invention has been described with respect to specific embodiments, it will be appreciated that the invention is intended to cover all modifications and equivalents within the scope of the following claims.

What is claimed is:

1. A method for operating a functional unit of a microprocessor, the method comprising:

receiving an opcode designating one of a plurality of supported operations to be performed and one or more operands on which the designated operation is to be performed;

in response to the opcode and the one or more operands, selecting a plurality of inputs M2, µ2, M1, µ1 and M0, wherein selecting M2 includes selecting between a first operand A and a first coefficient $F_2(x_b)$ provided by a first lookup table, selecting M1 includes selecting between a second operand B and a second coefficient $F_1(x_b)$ provided by a second lookup table, selecting µ2 includes selecting between a third operand and the square of a fourth operand $x_h$, and selecting µ1 includes selecting between the fourth operand $x_h$ and a fifth operand; and operating a plurality of configurable arithmetic circuits in the functional unit to compute an operation result of the form M2*µ2+M1*µ1+M0 from the selected inputs M2, µ2, M1, µ1 and M0, wherein the plurality of supported operations includes a unary function approximation (UFA) operation for approximating a unary function ƒ(x) of an argument operand x and a planar interpolation (PI) operation for performing planar interpolation on coordinate operands x and y, wherein selecting the plurality of inputs M2, µ2, M1, µ1 and M0 includes:

in the event that the UFA operation is designated, selecting the plurality of inputs M2, µ2, M1, µ1 and M0 such that the configurable arithmetic circuits compute an operation result corresponding to $F_2(x_b)*x_h{}^2+F_1(x_b)*x_h+F_0(x_b)$, wherein $x_b$ is a baseline value, $x_h$ is the difference between the argument operand x and the baseline value $x_b$, and $F_2$, $F_1$, and $F_0$ are coefficients determined based on the baseline value $x_b$ and the unary function ƒ(x); and in the event that the PI operation is designated, selecting the plurality of inputs M2, μ2, M1, μ1 and M0 such that the configurable arithmetic circuits compute an operation result corresponding to A*x+B*y+Δ, wherein A, B, and C are interpolation parameters and Δ is an offset term that depends at least in part on the interpolation parameter C, wherein selecting the plurality of inputs M2, μ2, M1, μ1 and M0 in the event that the PI operation is designated further includes:

obtaining the interpolation coefficients A, B, and C;

selecting the interpolation coefficients A and B as inputs M2 and M1, respectively; and selecting the coordinate operands x and y as inputs μ2 and μ1, respectively, wherein the interpolation coefficients A, B, and C are obtained from the one or more operands on which the PI operation is to be performed, wherein selecting the plurality of inputs M2, μ2, M1, μ1 and M0 in the event that the PI operation is designated further includes:

selecting the interpolation coefficient C as the input M0.

2. The method of claim 1, wherein selecting the plurality of inputs M2, μ2, M1, μ1 and M0 in the event that the UFA operation is designated further includes:

computing the baseline value $x_b$ and the difference $x_h$ from the input operand x;

accessing a coefficient memory unit using the baseline value $x_b$ to obtain coefficients $F_2$ and $F_1$;

computing a squared difference $x_h^2$;

selecting coefficients $F_2$ and $F_1$ as inputs M2 and M1, respectively; and selecting the squared difference $x_h^2$ and the difference $x_h$ as inputs μ2 and μ1 respectively.

3. The method of claim 2, wherein selecting the plurality of inputs M2, μ2, M1, μ1 and M0 in the event that the UFA operation is designated further includes:

accessing the coefficient memory unit using the baseline value $x_b$ to obtain coefficient $F_0$; and selecting coefficient $F_0$ as input M0.

4. The method of claim 3, wherein selecting the plurality of inputs M2, μ2, M1, μ1 and M0 in the event that the UFA operation is designated further includes:

accessing the coefficient memory unit using the baseline value $x_b$ to obtain coefficient $F_0$;

adding a rounding bias to coefficient $F_0$; and selecting the biased coefficient $F_0$ as input M0.

5. The method of claim 4, wherein the plurality of supported operations includes a plurality of different UFA operations and wherein the rounding bias is based at least in part on which of the plurality of different UFA operations is designated.

6. The method of claim 2, wherein the plurality of supported operations includes a plurality of different UFA operations and wherein accessing the coefficient memory unit further includes accessing the coefficient memory unit in an opcode-dependent manner.

7. The method of claim 6, wherein the plurality of different UFA operations includes a trigonometric operation, an exponential operation, a logarithm operation, a reciprocal operation, and a reciprocal square root operation.

8. The method of claim 1, wherein the interpolation coefficients A, B, and C are obtained from an internal storage circuit of the functional unit.

9. The method of claim 1, wherein selecting the plurality of inputs M2, μ2, M1, μ1 and M0 in the event that the PI operation is designated further includes:

obtaining coordinate offsets dx and dy;

computing the offset term Δ as Δ=A*dx+B*dy+C, and selecting the offset term Δ as the input M0.

10. The method of claim 4, wherein the coordinate offsets dx and dy are obtained from the one or more operands on which the PI operation is to be performed.

11. The method of claim 4, wherein the coordinate offsets dx and dy are obtained from an internal storage circuit of the functional unit.

12. The method of claim 1, wherein selecting the plurality of inputs M2, μ2, M1, μ1 and M0 in the event that the PI operation is designated further includes obtaining a plurality of different coordinate offsets $dx_i$ and $dy_i$; and computing a plurality of offset terms $Δ_i$ as $Δ_i=A*dx_i+B*dy_i+C$.

13. The method of claim 12, further comprising, in the event that the PI operation is designated:

selecting the plurality of offset terms $Δ_i$ as a plurality of parallel inputs $M0_i$; and operating the plurality of configurable arithmetic circuits to compute a plurality of parallel operation results of the form $M2*μ2+M1*μ1+M0_i$.

14. The method of claim 1, wherein the plurality of supported operations further includes a planar interpolation with perspective correction (IPAW) operation, the method further comprising:

in the event that the IPAW operation is designated, operating a configurable multiplier module in the functional unit to multiply the operation result by a perspective parameter, thereby generating a perspective-corrected operation result.

15. The method of claim 14, wherein the perspective parameter is obtained from the one or more operands on which the IPAW operation is to be performed.

16. The method of claim 14, wherein the perspective parameter is obtained from an internal storage circuit of the functional unit.

17. The method of claim 14, wherein the plurality of supported operations further includes a planar interpolation without perspective correction (IPA) operation, and wherein the perspective parameter is determined at least in part by operating the functional unit to perform an IPA operation prior to performing the IPAW operation.

18. The method of claim 14, wherein the plurality of supported operations further includes a multiplication (MUL) operation for multiplying two factor operands, the method further comprising, in the event that the MUL operation is designated:

providing the two factor operands as inputs to the multiplier module; and operating the multiplier module to compute a product result from the factor operands.

* * * * *